US012586219B2

(12) United States Patent
Jones et al.

(10) Patent No.: US 12,586,219 B2
(45) Date of Patent: Mar. 24, 2026

(54) FAST KINEMATIC CONSTRUCT METHOD FOR CHARACTERIZING ANTHROPOGENIC SPACE OBJECTS

(71) Applicant: Ophillia Holdings, Inc., Fairmont, WV (US)

(72) Inventors: Stacey Jones, Fairmont, WV (US); Stanley Smith, Ruskin, FL (US)

(73) Assignee: Ophillia Holdings, Inc., Fairmont, WV (US)

( * ) Notice: Subject to any disclaimer, the term of this patent is extended or adjusted under 35 U.S.C. 154(b) by 88 days.

(21) Appl. No.: 18/289,093

(22) PCT Filed: May 1, 2023

(86) PCT No.: PCT/US2023/020543
§ 371 (c)(1),
(2) Date: Nov. 9, 2023

(87) PCT Pub. No.: WO2023/215217
PCT Pub. Date: Nov. 9, 2023

(65) Prior Publication Data
US 2025/0104255 A1     Mar. 27, 2025

Related U.S. Application Data

(60) Provisional application No. 63/364,279, filed on May 6, 2022.

(51) Int. Cl.
*G06T 7/254* (2017.01)
*G06T 7/215* (2017.01)

(52) U.S. Cl.
CPC .............. *G06T 7/254* (2017.01); *G06T 7/215* (2017.01)

(58) Field of Classification Search
CPC ........... G06T 7/254; G06T 7/215; G06T 7/20; G06V 10/30; G06V 10/50; G06V 10/764
See application file for complete search history.

(56) References Cited

U.S. PATENT DOCUMENTS

2013/0287111 A1    10/2013    Xu et al.
2015/0178941 A1     6/2015    Banno
(Continued)

FOREIGN PATENT DOCUMENTS

CN        109283587 A  *   1/2019    .............. G01V 3/12
FR          2810744 A1  *  12/2001    .............. G01V 8/10
(Continued)

OTHER PUBLICATIONS

Calvi et al., "Machine Learning Techniques for Detection and Tracking of Space Objects in Optical Telescope Images," 2021, Aerospace Europe Conference (AEC) 2021, Nov. 23-26, 2021, Warsaw, Poland, PSAA. <URL: https://psaa.meil.pw.edu.pl/AEC2021/Papers/AEC_2021_067_Calvi_Jason.pdf> (Year: 2021).*
(Continued)

*Primary Examiner* — Emily C Terrell
*Assistant Examiner* — Julia Z. Yao
(74) *Attorney, Agent, or Firm* — Warren D. Schickli; Stites & Harbison PLLC

(57)                ABSTRACT
A method for characterizing anthropogenic space objects, includes the steps of: receiving, by computing device, sensing and imaging electro-optical pixel data respecting the anthropogenic space objects, performing, by the computing device, ambient level correction of the electro-optical pixel data by subtracting background noise attributed to wide field luminescence due to stars and cosmic radiation and creating, by the computing device, fast kinematic constructs for the anthropogenic space objects whereby the anthropogenic space objects are detected, discriminated and characterized.

18 Claims, 14 Drawing Sheets

(56) References Cited

U.S. PATENT DOCUMENTS

| | | | | |
|---|---|---|---|---|
| 2015/0206009 A1* | 7/2015 | Banno | | G06T 5/10 |
| | | | | 382/103 |
| 2018/0089538 A1 | 3/2018 | Graham et al. | | |
| 2018/0232596 A1* | 8/2018 | Gal-Yam | | G06V 10/443 |
| 2019/0120955 A1* | 4/2019 | Zhong | | G01S 13/931 |
| 2019/0197724 A1* | 6/2019 | Lee | | G06T 7/73 |
| 2021/0064849 A1* | 3/2021 | Shaddix | | G06F 18/23 |
| 2023/0215039 A1* | 7/2023 | Pignol | | B64G 1/361 |
| | | | | 382/103 |
| 2024/0185438 A1* | 6/2024 | Montanaro | | G06T 7/248 |

FOREIGN PATENT DOCUMENTS

| | | | | |
|---|---|---|---|---|
| JP | 2000025700 | A | * | 1/2000 |
| JP | 2002310616 | A | * | 10/2002 |
| JP | 3548998 | B2 | * | 8/2004 |
| JP | 2005085012 | A | * | 3/2005 |

OTHER PUBLICATIONS

Xi et al., "Space Debris Detection Using Feature Learning of Candidate Regions in Optical Image Sequences," in IEEE Access, vol. 8, pp. 150864-150877, 2020, doi: 10.1109/ACCESS.2020. 3016761 (Year: 2020).*

Mahendrakar et al., "Use of Artificial Intelligence for Feature Recognition and Flightpath Planning Around Non-Cooperative Resident Space Objects," 2021, American Institute of Astronautics (AIAA), Ascend 2021, doi:10.2514/6.2021-4123. <URL: https://arc.aiaa.org/doi/pdf/10.2514/6.2021-4123> (Year: 2021).*

Mahendrakar et al., "Real-time Satellite Component Recognition with YOLO-V5," 2021, 35th Annual Small Satellite Conference, Utah State University, Logan, UT. (Year: 2021).*

Bai et al., "Vision-Based State Estimation for Non-Cooperative Targets in Space," 2019 IEEE International Conference on Unmanned Systems (ICUS), Beijing, China, 2019, pp. 742-749, doi: 10.1109/ICUS48101.2019.8996037. (Year: 2019).*

Ralph et al. Real-Time Event-Based Unsupervised Feature Consolidation and Tracking for Space Situational Awareness. Front Neurosci. May 6, 2022;16:821157. doi: 10.3389/fnins.2022.821157. (Year: 2022).*

Zuehlke et al., "An End-to-End Process for Local Space Situational Awareness from Optical Observers," 2020 IEEE/ION Position, Location and Navigation Symposium (PLANS), Portland, OR, USA, 2020, pp. 1547-1555, doi: 10.1109/PLANS46316.2020. 9109868. (Year: 2020).*

Lovell et al., "Processing of Space Object Data from Optical Observers for Space Domain Awareness," 2021 IEEE Aerospace Conference (50100), Big Sky, MT, USA, 2021, pp. 1-11, doi: 10.1109/AERO50100.2021.9438157. (Year: 2021).*

Comellini et al., "Robust Navigation Solution for Vision-Based Autonomous Rendezvous," 2021 IEEE Aerospace Conference (50100), Big Sky, MT, USA, 2021, pp. 1-14, doi: 10.1109/AERO50100. 2021.9438241. (Year: 2021).*

Salvatore et al., "Learned Event-based Visual Perception for Improved Space Object Detection," 2022 IEEE/CVF Winter Conference on Applications of Computer Vision (WACV), Waikoloa, HI, USA, 2022, pp. 3301-3310, doi: 10.1109/WACV51458.2022.00336. (Year: 2022).*

Lichter et al., "State, shape, and parameter estimation of space objects from range images," IEEE International Conference on Robotics and Automation, 2004. Proceedings. ICRA '04. 2004, New Orleans, LA, USA, 2004, pp. 2974-2979 vol. 3, doi: 10.1109/ROBOT.2004.1307513. (Year: 2004).*

Peng, "Virtual Stereovision Pose Measurement of Noncooperative Space Targets for a Dual-Arm Space Robot," in IEEE Transactions on Instrumentation and Measurement, vol. 69, No. 1, pp. 76-88, Jan. 2020, doi: 10.1109/TIM.2019.2893010. (Year: 2019).*

Nesnas et al. (2021) Autonomous Exploration of Small Bodies Toward Greater Autonomy for Deep Space Missions. Front. Robot. AI 8:650885. doi: 10.3389/frobt.2021.650885 (Year: 2021).*

Torteeka et al., "Autonomous space target tracking through state estimation techniques via ground-based passive optical telescope" 2019, Advances in Space Research, vol. 63, issue 1, pp. 461-475, ISSN 0273-1177, https://doi.org/10.1016/j.asr.2018.09.012. (Year: 2019).*

Lal, "Visual Servo Based Space Robotic Docking for Active Space Debris Removal," Dec. 2021, York University, Mechanical Engineering, Thesis for Master of Science. (Year: 2021).*

Oumer, "Visual Tracking and Motion Estimation for an On-orbit Servicing of a Satellite," Mar. 2016, University of Osnabruck, Computer Science, Thesis for doctoral degree (PhD) in natural sciences in the field of computer science. (Year: 2016).*

Grompone, "Vision-Based 3D Motion Estimation for Onorbit Proximity Satellite Tracking and Navigation," Jun. 2015, Naval Postgraduate School, Monterey, California, Thesis for Master of Science in Engineering Science (Electrical Engineering). (Year: 2015).*

Bochkovskiy, et al., "YOLOv4: Optimal Speed and Accuracy of Object Detection" 1-17. https://paperswithcode.com/paper/yolov4-optimal-speed-and-accuracy-of-object. Apr. 23, 2020.

* cited by examiner

Figure 2B:
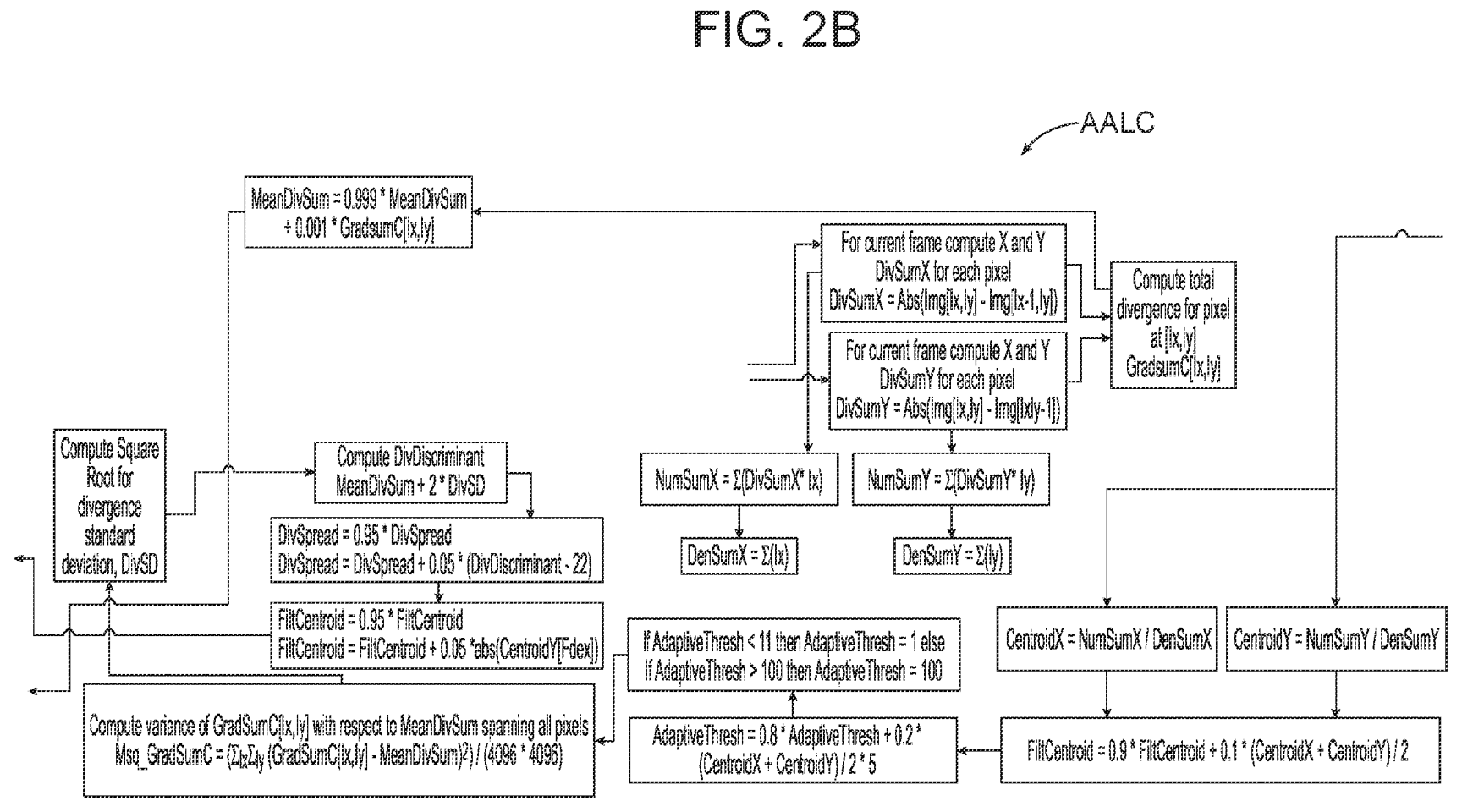

AALC

Compute total divergence for pixel at [ix,iy] GradSumC[ix,iy]

For current frame compute X and Y DivSumX for each pixel DivSumX = Abs[Img[ix,iy] - Img[ix-1,iy]]

For current frame compute X and Y DivSumY for each pixel DivSumY = Abs[Img[ix,iy] - Img[ix,iy-1]]

NumSumX = Σ(DivSumX* ix)

DenSumX = Σ(ix)

NumSumY = Σ(DivSumY* iy)

DenSumY = Σ(iy)

CentroidX = NumSumX / DenSumX

CentroidY = NumSumY / DenSumY

FiltCentroid = 0.9 * FiltCentroid + 0.1 * (CentroidX + CentroidY) / 2

If AdaptiveThresh < 11 then AdaptiveThresh = 1 else if AdaptiveThresh > 100 then AdaptiveThresh = 100

AdaptiveThresh = 0.8 * AdaptiveThresh + 0.2 * (CentroidX + CentroidY) / 2 * 5

MeanDivSum = 0.999 * MeanDivSum + 0.001 * GradSumC[ix,iy]

Compute DivDiscriminant MeanDivSum + 2 * DivSD

DivSpread = 0.95 * DivSpread DivSpread = DivSpread + 0.05 * (DivDiscriminant : 22)

FiltCentroid = 0.95 * FiltCentroid FiltCentroid = FiltCentroid + 0.05 *abs(CentroidY[Tr-dex])

Compute variance of GradSumC[ix,iy] with respect to MeanDivSum spanning all pixels Msq_GradSumC = Σ_ix Σ_iy (GradSumC[ix,iy] - MeanDivSum]2) / (4096 * 4096)

Compute Square Root for divergence standard deviation, DivSD

FIG. 2C(1)
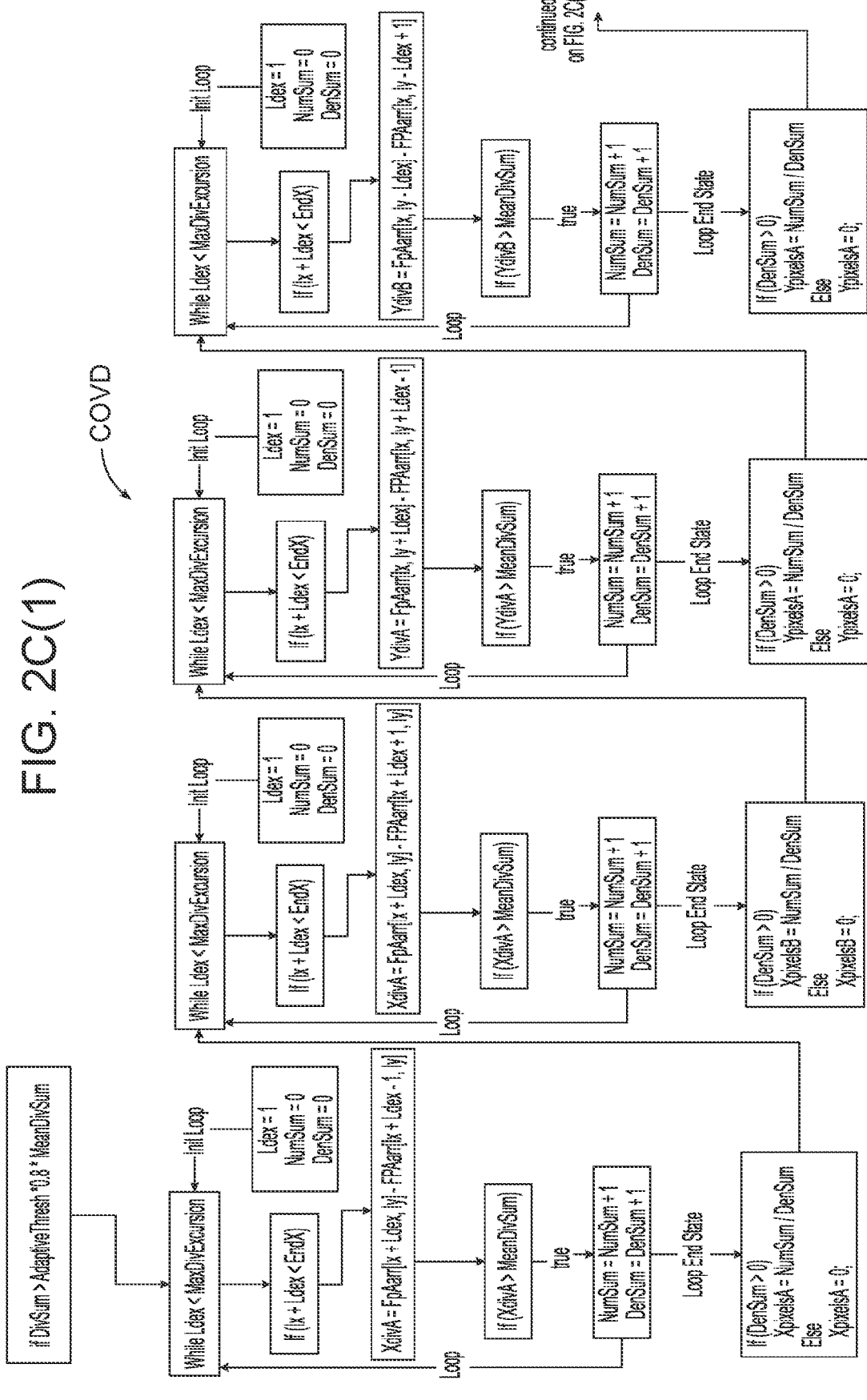

FIG. 2C(2)
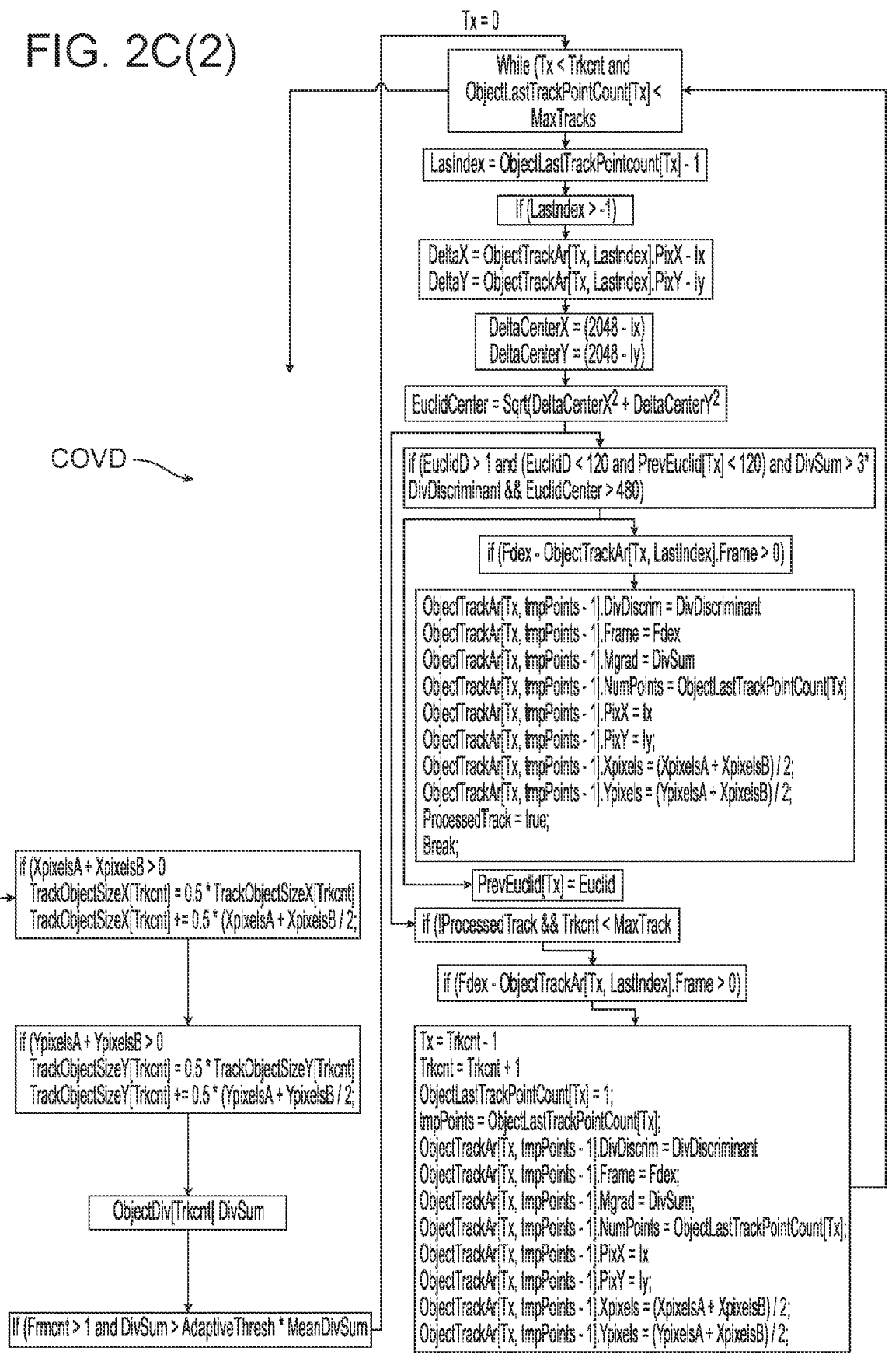

Multi-Hypothesis Tracking (Part 1)

Multi-Hypothesis Tracking (Part 1)

Multi-Hypothesis Tracking (Part 1)

Multi-Hypothesis Tracking (Part 2)

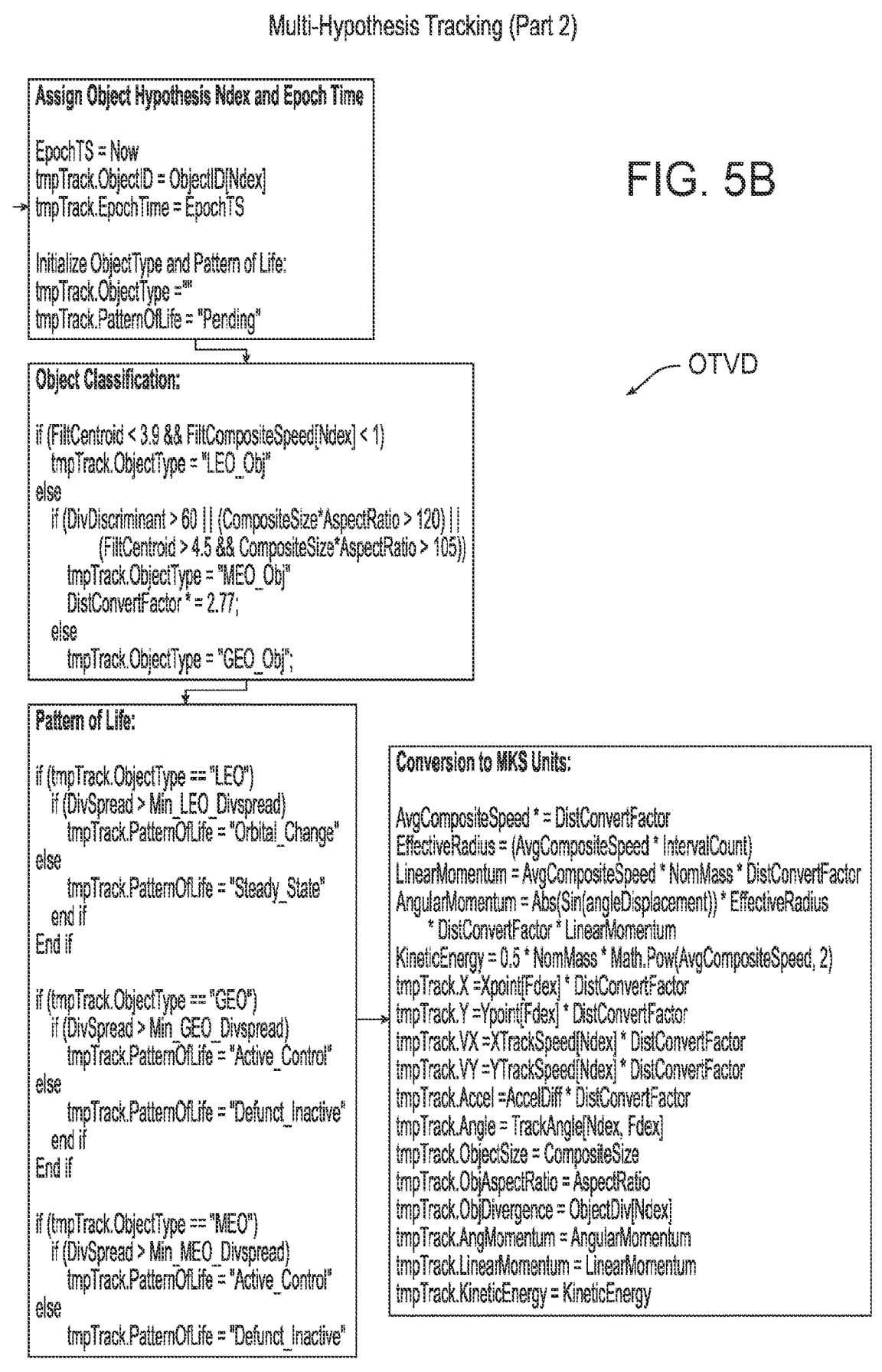

Multi-Hypothesis Tracking (Part 2)

FIG. 5B

OTVD

```
Assign Object Hypothesis Ndex and Epoch Time

EpochTS = Now
tmpTrack.ObjectID = ObjectID[Ndex]
tmpTrack.EpochTime = EpochTS

Initialize ObjectType and Pattern of Life:
tmpTrack.ObjectType =""
tmpTrack.PatternOfLife = "Pending"
```

```
Object Classification:

if (FiltCentroid < 3.9 && FiltCompositeSpeed[Ndex] < 1)
    tmpTrack.ObjectType = "LEO_Obj"
else
    if (DivDiscriminant > 60 || (CompositeSize*AspectRatio > 120) ||
        (FiltCentroid > 4.5 && CompositeSize*AspectRatio > 105))
        tmpTrack.ObjectType = "MEO_Obj"
        DistConvertFactor * = 2.77;
    else
        tmpTrack.ObjectType = "GEO_Obj";
```

```
Pattern of Life:

if (tmpTrack.ObjectType == "LEO")
    if (DivSpread > Min_LEO_Divspread)
        tmpTrack.PatternOfLife = "Orbital_Change"
else
        tmpTrack.PatternOfLife = "Steady_State"
    end if
End If if (tmpTrack.ObjectType == "GEO")
    if (DivSpread > Min_GEO_Divspread)
        tmpTrack.PatternOfLife = "Active_Control"
else
        tmpTrack.PatternOfLife = "Defunct_Inactive"
    end if
End If if (tmpTrack.ObjectType == "MEO")
    if (DivSpread > Min_MEO_Divspread)
        tmpTrack.PatternOfLife = "Active_Control"
else
        tmpTrack.PatternOfLife = "Defunct_Inactive"
```

```
Conversion to MKS Units:

AvgCompositeSpeed * = DistConvertFactor
EffectiveRadius = (AvgCompositeSpeed * IntervalCount)
LinearMomentum = AvgCompositeSpeed * NomMass * DistConvertFactor
AngularMomentum = Abs(Sin(angleDisplacement)) * EffectiveRadius
        * DistConvertFactor * LinearMomentum
KineticEnergy = 0.5 * NomMass * Math.Pow(AvgCompositeSpeed, 2)
tmpTrack.X =Xpoint[Fdex] * DistConvertFactor
tmpTrack.Y =Ypoint[Fdex] * DistConvertFactor
tmpTrack.VX =XTrackSpeed[Ndex] * DistConvertFactor
tmpTrack.VY =YTrackSpeed[Ndex] * DistConvertFactor
tmpTrack.Accel =AccelDiff * DistConvertFactor
tmpTrack.Angle = TrackAngle[Ndex, Fdex]
tmpTrack.ObjectSize = CompositeSize
tmpTrack.ObjAspectRatio = AspectRatio
tmpTrack.ObjDivergence = ObjectDiv[Ndex]
tmpTrack.AngMomentum = AngularMomentum
tmpTrack.LinearMomentum = LinearMomentum
tmpTrack.KineticEnergy = KineticEnergy
```

FAST KINEMATIC CONSTRUCT METHOD FOR CHARACTERIZING ANTHROPOGENIC SPACE OBJECTS

RELATED APPLICATIONS

This application is a 371 of International Patent Application No. PCT/US23/20543, filed May 1, 2023, which claims priority to U.S. Provisional Patent Application Ser. No. 63/364,279, filed May 6, 2022, the entirety of the contents of which is incorporated by reference herein.

TECHNICAL FIELD

Embodiments of this invention relate, in general, to methods and systems for digital signal processing.

BACKGROUND

A need exists within the broader scope of Space Domain Awareness (SDA) to discriminate between classes of anthropogenic space objects using currently available sensing and imaging technologies solutions. These solutions face the enormous challenges of providing timely, actionable information from less-than-ideal imagery using currently available sensing and imaging technologies, all within tightly constrained transfer bandwidths.

SUMMARY

In accordance with the purposes and benefits set forth herein, a new and improved method for characterizing anthropogenic space objects, comprises, consists of or consists essentially of: (a) receiving, by computing device, sensing and imaging electro-optical pixel data respecting the anthropogenic space objects, (b) performing, by the computing device, ambient level correction of the electro-optical pixel data by subtracting background noise attributed to wide field luminescence due to stars and cosmic radiation, and (c) creating, by the computing device, fast kinematic constructs for the anthropogenic space objects whereby the anthropogenic space objects are detected, discriminated and characterized.

In at least one of the many possible embodiments of the method, the method includes implementing, by the computing device, embedded convolution to characterize localized motion of the anthropogenic space objects. The implementing may be completed by the computing device using at least one functionalized component selected from a group consisting of Frame/Image Management (FIM), Autonomous Ambient Level Correction (AALC), Candidate Object divergence, size and pixel indices Values Derivation (COVD), Object Motion Features Rendering (OMFR) and Object Track classification and key kinematic feature Values Determination (OTVD). In one particularly useful embodiment, the implementing may be completed by the computing device via five functionalized components including Frame/Image Management (FIM), Autonomous Ambient Level Correction (AALC), Candidate Object divergence, size and pixel indices Values Derivation (COVD), Object Motion Features Rendering (OMFR) and Object Track classification and key kinematic feature Values Determination (OTVD).

In at least some embodiments, the method includes performing, by the computing device, You Only Process Once (YOPO) algorithmic processing whereby each frame of digital imagery is fully processed only once to provide more efficient Space Domain Awareness (SDA).

In at least one possible embodiment, the method includes receiving, in a buffer of the computing device, a Flexible Image Transport System (FITS) formatted image file and using, by the computing device, a customizable timer control loop so as to allow for differential pixel array loading and awaiting, by the computing device, a flagged response to initiate a request for subsequent frame processing. In at least some embodiments, the method includes time stamping, by the computing device, image arrival rather than relying upon sequential identification.

The method may further include performing, by the computing device, Autonomous Ambient Level Correction (AALC) to provide deterministic processing within a limited interval and with reduced bandwidth required for results data transfer. More specifically, the method may include completing, by the computing device, the AALC by (a) measuring the spatial gradient on both X and Y axes for each pixel in a current frame and a smooth filtered mean divergence sum, (b) updating during current frame processing weighted products and index weight sums, (c) computing current frame weighted centroid and updated filtered centroid and (d) computing (1) an adaptive threshold to partially qualify pixels for hypothesis track coordinates in addition to (2) a Gaussian divergence discriminant determined from the filtered mean plus two standard deviations.

In at least some embodiments, the method may include performing, by the computing device, Candidate Object divergence, size and pixel indices Values Derivation (COVD) when pixel divergence exceeds a product of the factored smooth mean divergence value and an adaptive threshold. This may include deriving, by the computing device, both vertical and horizontal divergence excursion ranges for determination of an inferred relative object size and aspect ratio with respect to each pixel in an array. The method may also include (a) recursively filtering, by the computing device, size components and (b) assigning, by the computing device, a local divergence for each pixel to an object instance used for qualified hypothesis tracks. Still further, the method may include (a) performing, by the computing device, a center pixel translation through calculation of DeltaCenterX and DeltaCenterY variables and (b) establishing, by the computing device, a pre-track object sequence array for any pixel that has a sufficient Euclidean distance with respect to a prior indexed object position and a Euclidean distance less than a maximum predetermined value. Still further, the method may include assigning to a current object element index, by the computing device, a current frame DivDiscriminant feature value, a current frame index (Tx), a current pixel divergence, a DivSum, an object sequence point count, pixel indices, and average excursion range for axes.

In at least one of the many possible embodiments, the method includes performing, by the computing device, an Object Motion Features Rendering (OMFR) component to render space object motion feature values for subsequent association to observed kinematic and orbital patterns. More specifically, this may include synchronizing, by the computing device, a current track index array with an associated object sequence index for the anthropogenic space object by traversing object sequence values and assigning (TrackIndex [Ndex]) as a current iteration interval while incrementing a hypothesis track (Ndex) which is the number of frame intervals assumed for the associated object pixel and/or rendering, by the computing device, track associated motion features using nested loops wherein track associated motion calculations include ordinate, abscissa, cubit fit (X and Y image plane axes independently), hypothesis track sequence length, current hypothesis track index, least square fit coefficients, maximum quadratic factors, and zeroth polynomial coefficient for valid tracks.

Still further, the method may include rendering, by the computing device, track associated motion features using nested loops wherein track associated motion calculations include ordinate, abscissa, cubit fit (X and Y image plane axes independently), hypothesis track sequence length, current hypothesis track index, least square fit coefficients, maximum quadratic factors, and zeroth polynomial coefficient for valid tracks. More specifically, the OTVD may include, performing, by the computing device: (a) histogram integrating of a differential track angle index, (b) determining a filtered composite speed along the track, (c) determining hybrid kinetic parameters derived from the filtered composite speed, (d) estimating an object aspect ratio and zero-crossing counts during track, (e) establishing scale factors based on frame rate and orbital radii, (f) qualifying the track by sufficient filtered composite speed and minimum frame count, (g) setting epoch time of frame interval and resetting object type and pattern of life, (h) performing object classification through Boolean arbitration of static and dynamic features, (i) concluding the pattern of life based on object type and divergence spread, (j) converting object, presumed mass, and motion parameters to physics parameters and (k) determining parameter significance when corroborated with 3D centered coordinate data.

In the following description, there are shown and described several different embodiments of the new and improved method for characterizing anthropogenic space objects. As it should be realized, that method is capable of other, different embodiments and its several details are capable of modification in various, obvious aspects all without departing from the method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate certain aspects of the method and together with the description serve to explain certain principles thereof. A person of ordinary skill in the art will readily recognize from the following discussion that alternative embodiments of the illustrated method may be employed without departing from the principles described below.

FIG. 1 is a schematic block diagram of five functional components of the Fast Kinematic Construct Approach (FKCA) used in the new and improved method for characterizing anthropogenic space objects.

FIG. 2, generally illustrates on one sheet the processing steps of the overall method and identifies those blocks forming each of the five functional components illustrated in FIG. 1.

FIG. 2A provides a detailed illustration of the blocks forming the Frame/Image Management (FIM) component of the method illustrated in FIG. 2.

FIG. 2B provides a detailed illustration of the blocks forming the Autonomous Ambient Level Correction (AALC) component of the method illustrated in FIG. 2.

FIG. 2C(1) and FIG. 2C(2) provide a detailed illustration of the blocks forming the Candidate Object divergence, size and pixel indices Values Derivation (COVD) component of the method illustrated in FIG. 2.

FIG. 2D provides a detailed illustration of the blocks forming the Object Motion features Rendering (OMFR) component of the method illustrated in FIG. 2.

FIG. 2E provides a detailed illustration of the blocks forming the Object Track classification and key kinematic feature Values Determination (OTVD) component of the method illustrated in FIG. 4C.

FIGS. 5A and 5B illustrate Part 2 of the multi-hypothesis tracking aspect of the OTVD component.

Figure 2:
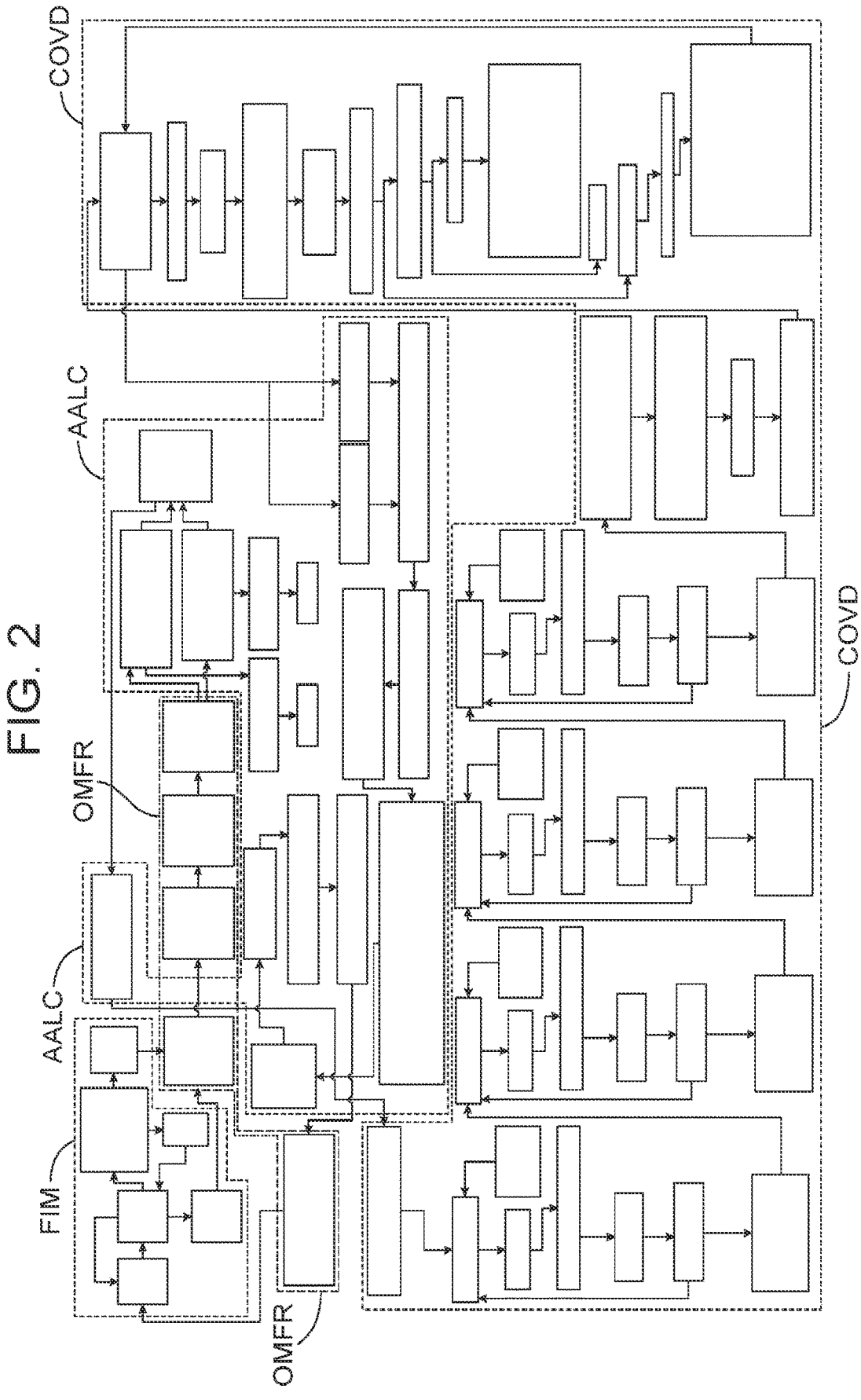

Reference will now be made in detail to the present preferred embodiments of the method

DETAILED DESCRIPTION

The method for characterizing anthropogenic space objects disclosed herein may be broadly described as including the steps of: (a) receiving, by computing device, sensing and imaging electro-optical pixel data respecting the anthropogenic space objects, (b) performing, by the computing device, ambient level correction of the electro-optical pixel data by subtracting background noise attributed to wide field luminescence due to stars and cosmic radiation and (c) creating, by the computing device, fast kinematic constructs for the anthropogenic space objects whereby the anthropogenic space objects are detected, discriminated and characterized.

The Fast Kinematic Construct Approach (FKCA), that is used in the method, addresses the enormous challenge of providing timely, actionable information from less-than-ideal imagery using currently available sensing and imaging technologies, all within tightly constrained transfer bandwidths. This is accomplished while providing better capabilities to characterize manmade satellites' states as well as their activities in geosynchronous-(GEO), medium-(MEO), low-earth-orbit (LEO) and other space regimes. FKCA is an SDA solution that more optimally exploits available resources to support Intelligence, Surveillance, Reconnaissance (ISR) and similar missions. FKCA accomplishes this by performing ambient level correction (background subtraction) of electro-optical (EO) pixel data attributed to wide field luminance due to stars and cosmic radiation, eliminating the need for spatially-synchronized radiation reference tables or collocated radiometer fusion solutions. Using focal point array normalization of the associated pixel divergence, an adaptive threshold weighted by the temporal gradient of quasi-stationary pixels, FKCA provides dynamic pixel discrimination without the need for the use of reference information, by using specialized filtering.

Moreover, by creating Fast Kinematic Constructs (FKCs) to manage and render novel, dynamically-sized, structured results, FKCA enables efficient space object detection, discrimination, and characterization. When significant space object events are detected, FKCs are derived and populated with satellite type and other key parameters within the frame interval and with minimal bandwidth requirements, for timely data transfer of respective results. FKCA thus better enables the extracting of critical information from the available, noisy, ground-based electro-optical technology imagery, facilitating more rapid communication of events and with better data transfer efficiencies, better enabling time-critical SDA responses.

Additionally, imaging technologies and sensors used for SDA span a wide range of capabilities and limitations-many having noisy or incomplete information, along with highly-variable, pixel-based propagation speeds. FKCA is designed to accommodate these limitations while providing useful characterizations of wide ranges of objects, providing actionable and timely information that is extracted from less-than-ideal imagery, all within tight transfer bandwidth requirements.

FKCA may be used to characterize satellite types in LEO, MEO and GEO orbits to levels sufficient to alert further investigation for follow-on processing to yield even higher fidelity characterizations. Significant space object events may be detected using less than 35% of the original data imagery which is important in the case of data loss during interruption conditions in transmission or data transfer. While larger numbers of and broader-populated datasets associated with satellite types and pattern of life scenarios (POLS) observed render improvements to FKCA's performance and applicability, extracting pertinent high-level information from available noisy ground-based electro-optical technology imagery is achieved through use of FKCA. Further, these results are achieved much faster and with much higher data transfer efficiencies, both factors being very important to devising appropriate SDA responses.

The published Space Surveillance Network (SSN) configuration includes 30+ ground-based sensors and 6 satellites, and many of the sensors on these platforms employ electro-optical technology. Most of the space imagery currently available for ISR consists of dots and streaks that must be analyzed to extract as much pertinent and actionable information as possible to enable timely response to imminent threats.

FKCA facilitates better SDA solutions by providing a first-order alert system for GEO, MEO or LEO satellite activity, identifying those events which rise to a level sufficient to alert further investigation by more downstream artificial intelligence (AI)/machine learning (ML) or other processing systems devoted to additional specialized processing. Autonomous sensor tasking using FKCA may thus better advance the overall ISR strategy by providing timelier first-level event identification and evaluations while promoting faster transfer rates from lower data amounts required for alert results transmissions.

FKCA involves analytical use of pixel-derived features from telescopic electro-optical imagery for systematic identification of space objects and associated characteristic motion in a multi-tier process. The approach is both inductive and deductive, aimed at identifying features that maximize object discrimination and relative motion over time. The components run sequentially during FKCA initialization and concurrently during subsequent execution; as such, FKCA is designed for continuous operation. FKCA implements embedded convolution to characterize localized motion via five (5) functional components that execute by frame, using multi-frames, traverse at the pixel level, involve multi-pixel windows and/or involve other iterative processing as indicated for that component.

Figure 1:
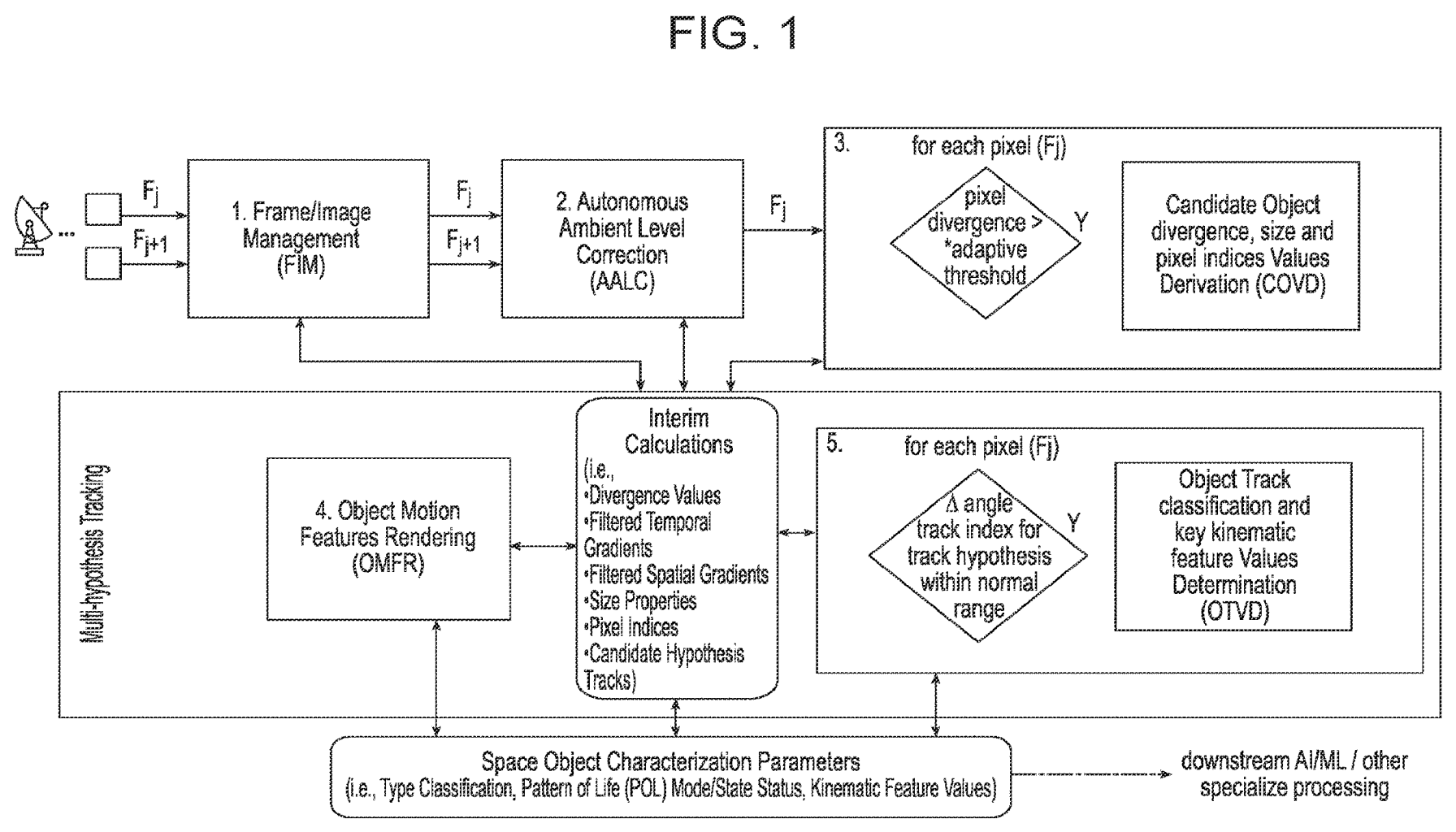

As shown in FIG. 1, the five (5) functional components of FKCA are (1) Frame/Image Management (FIM), (2) Autonomous Ambient Level Correction (AALC), (3) Candidate Object divergence, size and pixel indices Values Derivation (COVD), (4) Object Motion Features Rendering (OMFR) and (5) Object Track classification and key kinematic feature Values Determination (OTVD). Components (3), (4) and (5) are executed for conditions that meet or exceed specified thresholds that successively qualify hypothesis tracks and related interim values for further FKCA processing. Components (4) and (5) are the core processes for the signature multi-hypothesis tracking (see also FIGS. 4 and 5).

Figure 2A:
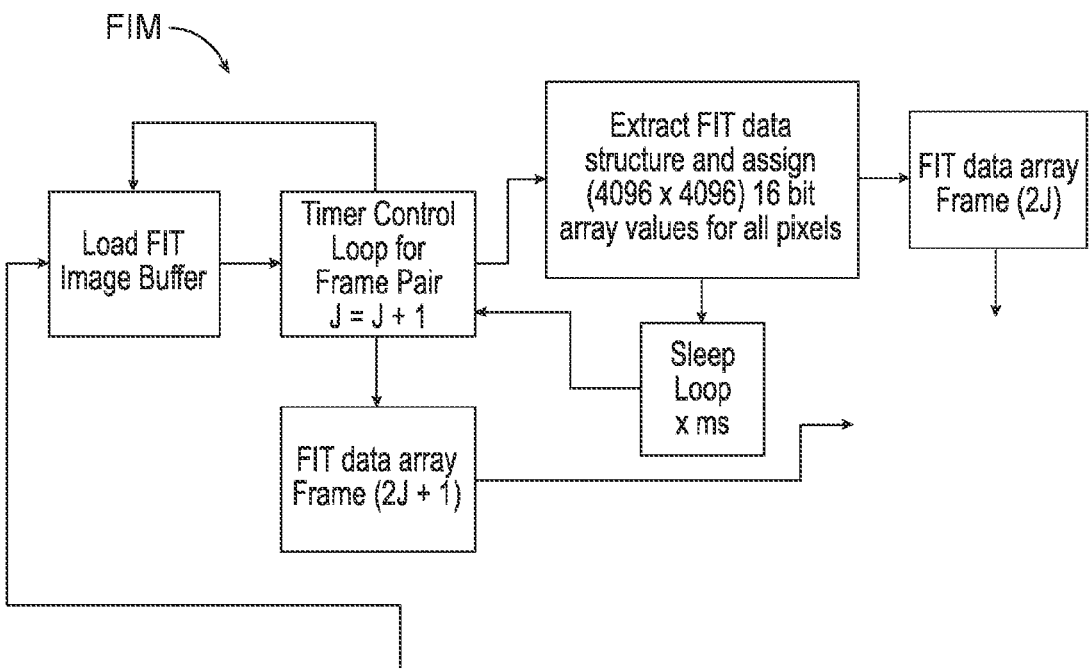

FKCA performs You Only Process Once (YOPO) algorithmic processing which means that each frame of digital imagery is fully processed only once (i.e., no back track processing) which contributes to its innovative value and lends to highly efficient SDA operation. The Frame/Image Management (FIM) component is necessary to allow and ensure that all current frame imagery processing is complete and that there is no temporary memory collision(s) involving the next frame. FIM is integral to FKCA's YOPO execution and includes loading a 4096×4094 Flexible Image Transport System (FITS) formatted image file into a local processing unit buffer. Using a customizable timer control loop, the FIM component allows for differential pixel array loading and awaits a flagged response to initiate a request for subsequent frame processing. The FIM technique operates such that small numbers of dropped transmissions (i.e., image transfer loss) will not adversely affect the overall FKCA processing as it time stamps the arrival of the image versus relying on sequential identification. The FIM processing portion of the method is illustrated in detail in FIG. 2A. FIG. 2 illustrates the FIM processing portion within the overall FKCA method.

Figure 3:
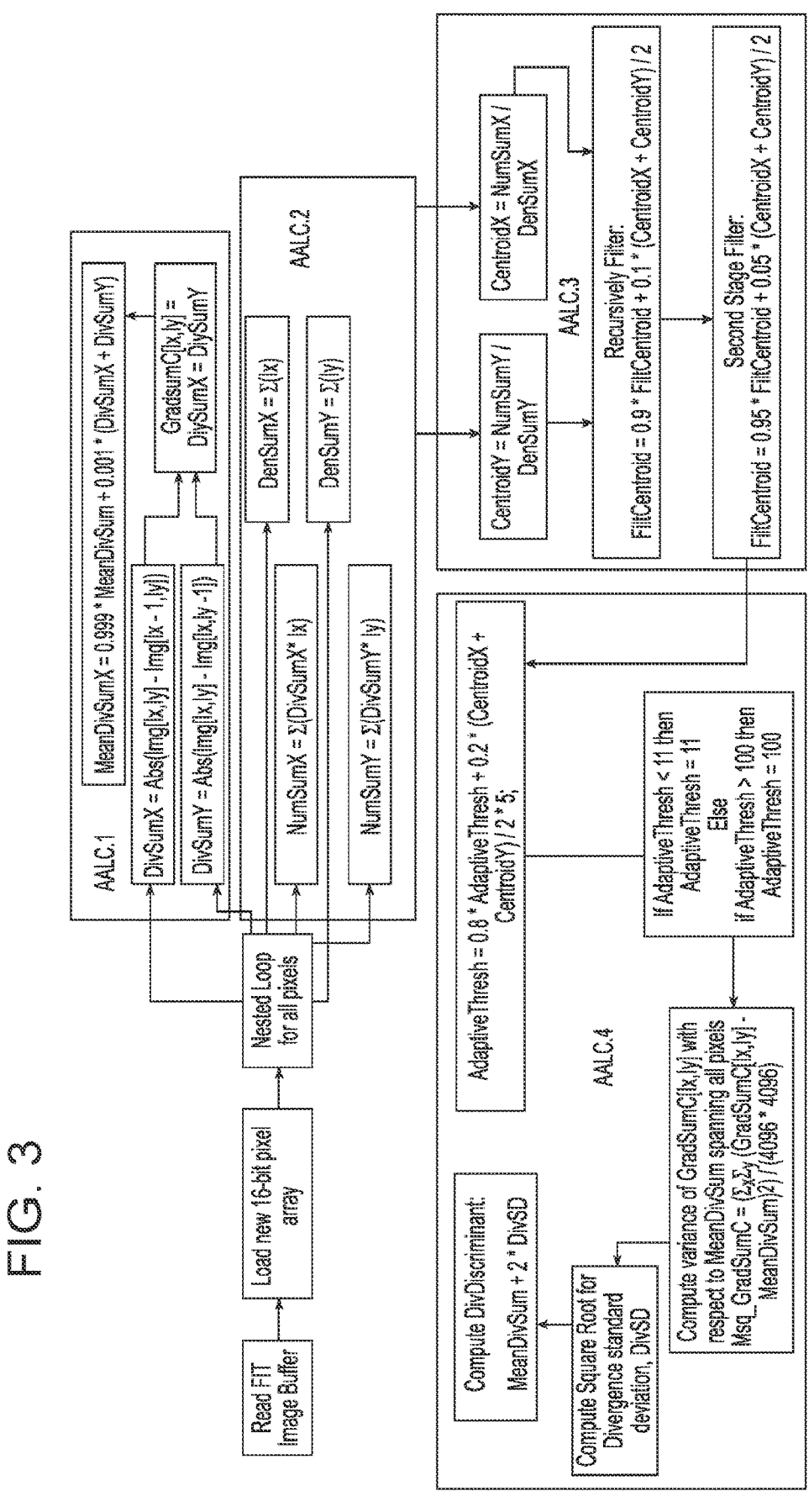
FIG. 3 illustrates the interaction of the four subcomponents of AALC.

The Autonomous Ambient Level Correction (AALC) component is the essential point of departure for identifying the existence of significant space activity that with subsequent processing, evolves to specific satellite type identification, quantitative range/speed transformation, object type/mode classification and other pertinent space object characterization information. AALC provides deterministic processing within a limited interval and with much less bandwidth required for results data transfer. Performance of AALC is not significantly degraded if a single or even a small number of frames are absent from the time series sensor data collection. Using focal point array normalization of the associated pixel divergence, an adaptive threshold weighted by the temporal gradient of quasi-stationary pixels, provides dynamic pixel discrimination. As shown in FIG. 3, AALC is performed via four (4) subcomponents:

AALC.1 Measure the spatial gradient on both X and Y axes for each pixel in the current frame and the smooth filtered mean divergence sum.

AALC.2 Update during current frame processing weighted products and index weight sums.

AALC.3 Compute current frame weighted centroid and updated filtered centroid.

AALC.4 Compute the adaptive threshold to partially qualify pixels for hypothesis track coordinates in addition to a Gaussian divergence discriminant determined from the filtered mean plus two standard deviations.

AALC.1: Involves measuring the spatial gradient on both X and Y axes for each pixel in the current frame and the smooth filtered mean divergence sum to establish a baseline for the adaptive threshold. While traversing each pixel in a nested fashion within the currently loaded frame buffer, the spatial gradient magnitude components, namely, DivSumX and DivSumY, are computed and stored as the associated pixel divergence for the individual cell [Ix, Iy] of the two-dimensional matrix called GradsumC. Secondly within the current pixel interval, the current divergence is filtered using a one-pole infinite impulse response (IIR) filter. Due to the high recursive coefficient of 0.999, the smooth filtered variable, MeanDivSum, constitutes a running mean value of the pixel divergence.

For this AALC.1, the entire focal point array of the current frame is used to measure the first-order gradient independently for the X and Y axes. The divergence magnitude associated for these axes is the absolute magnitude of these gradient components, namely, DivSumX and DivSumY, respectively. The peak divergence sum is tracked for the current frame and its associated coordinates. Finally, a smooth filtered mean value for each component is determined using an IIR one-pole filter with a recursive coefficient of 0.999. The effective time-constant for this filter is 670 which is highly dynamic relative to the number of 16 million summing operations per frame.

For a uniform field on a normal plane, the transverse components of photon fluence is monotonic with the divergence magnitude granularized for every point in the field at each localized X and Y indices as:

$$| Div[Pix(X, Y)] | =$$

$$\sum_{j=0}^{m} \big( \mathrm{abs}(Pix(X - j, Y) - Pix(X, Y)) + \mathrm{abs}(Pix(X + j, Y) - Pix(X, Y)) +$$

$$\sum_{k=0}^{n} (\mathrm{abs}(Pix(X, Y - k) - Pix(X, Y)) + \mathrm{abs}(Pix(X, Y + k) - Pix(X, Y))$$

where the range of significance of discrete integration for the estimated divergence is inclusive of the characteristic point spread function scale. In the limit, the recursive filtering adapts to the current frame mean divergence processed.

AALC.2: During current frame processing, weighted products and index weight sums are updated as part of the centroid calculation. During the current pixel iteration, two parallel operations need to be performed. The first two operations entail summing of each successive (DivSumX*Ix) product (contributing to NumSumX) and (DivSumY*Iy) product (contributing to NumSumY), respectively. These summations continue to accrue until all nested pixel divergence operations have been completed. Very similarly, the sum of the X and Y pixel indices, Ix and Iy, are summed for purposes of centroid normalization in AALC.3. Alternatively, the latter index sum accumulations are precomputed since these values are constants for a fixed pixel image size.

The centroid of divergence sum values is computed separately for the X and Y axes. This is achieved through a "center of mass" equivalent computation. This is efficiently achieved for the X axis by summing the magnitude divergence and row-index product and normalizing it by the sum of row indices. Similarly, this is computed for the Y axis with respect to the column indices, respectively.

$$NumSum\, X = S(DivSumX * Ix)$$

$$NumSum\, Y = S(DivSum\, Y * Iy)$$

$$DenSum\, X = S(Ix)$$

$$DenSum\, Y = S(Iy)$$

After completion of the frame, ratio values of these sums are used in AALC.3 to compute the divergence centroids.

AALC.3: Current frame weighted centroid and updated filtered centroid are computed to derive an approximation for the statistical median value (i.e., midpoint gradient to characterize frame data). After traversing all nested pixel combinations, a singular value of the centroid for the X axis, (CentroidX) and a singular value for the centroid of the Y axis (CentroidY), respectively, are computed which are representative of the entire frame. These centroids correspond to the X and Y product pair sums, NumSumY and NumSumX, and are normalized by their associated index variable sums, respectively. After the centroid components have been computed, the mean value of the conjugate pair (CentroidX+CentroidY)/2 is filtered at the frame rate using a one-pole IIR filter with a recursion coefficient of 0.9. This process is repeated using a second stage IIR filter but with a recursive coefficient of 0.95. This filtered centroid variable is referred to as FiltCentroid.

This step is performed upon finalization of the frame related product and index sums. The weighted divergence sum—index product sums are normalized by the sum of indexes as follows:

$$CentroidX = NumSum\, X\, /\, DenSum\, X$$

$$CentroidY = NumSum\, Y\, /\, DenSum\, Y$$

A recursive filter is used to compute the filtered centroid component mean (CentroidX+CetroidY)/2 as follows:

$$FiltCentroid = 0.9 * FiltCentroid + 0.1 * (CentroidX + CentroidY)/2$$

A second state recursive filter is similarly applied with a recursion coefficient of 0.95:

$$FiltCentroid = 0.95 * FiltCentroid + 0.05 * (CentroidX + CentroidY)/2$$

AALC.4 Next is the computing of the adaptive threshold to partially qualify pixels for hypothesis track coordinates and the determining of a Gaussian divergence discriminant from the filtered mean plus two standard deviations. At the frame rate an adaptive threshold (AdaptThresh) is recursively updated using a one-pole IIR filter and recursive coefficient of 0.8. The input to the filter is the mean current frame centroid multiplied by 5. This threshold is compared to upper and lower bounds of 100 and 11, respectively. If it exceeds the upper bound it is limited to 100. Similarly, if it is less than 11 than it is set to the value of 11. Next the variance of the GradSumC matrix elements is computed which is the mean-square deviation of the [Ix, Iy] elements within GradSumC with respect to current filtered MeanDivSum. The divergence standard deviation (DivSD) is computed as the square root of this variance. The primary discriminant for pixel exceedance detection is determined at this stage as the DivDiscriminant or (MeanDivSum plus 2*DivSD).

An adaptive threshold is created that is used in part for hypothesis track creation. The propagation of the numeric adaptive threshold is defined as follows using the current frame centroid component values:

$$AdaptiveThresh =$$

$$0.8 * AdaptiveThresh + 0.2 * (CentroidX + CentroidY)/2 * 5;$$

Both upper and lower limits are applied to limit sensitivity and miss detection of objects with marginal divergence features.

Both variance (mean square deviation from mean) and standard deviation (DivSD or square-root of variance) are computed using all [Ix, Iy] cells within the GradsumC matrix using the smooth filtered MeanDivSum defined as the computational divergence mean.

The resulting DivDisriminant parameter is computed as a Gaussian variate equal to MeanDivSum+2*DivSD. The AALC functionality is depicted in detail in FIG. 2B while FIG. 2 illustrates the AALC processing portion within the overall FKCA method.

The Candidate Object divergence, size and pixel indices Values Derivation (COVD) component is the conditional object property segment of FKCA that is executed when the pixel divergence exceeds the product of the factored smooth mean divergence value and the adaptive threshold. Both vertical and horizontal divergence excursion range for determination of an inferred relative object size and aspect ratio with respect to each pixel in the array, are derived. The size components are recursively filtered and the local divergence for the current pixel are assigned to an object instance used for qualified hypothesis tracks.

Secondly, a center image pixel translation is performed through calculation of the DeltaCenterX and DeltaCenterY variables. Qualification of a pixel that has a sufficient Euclidean distance with respect to a prior indexed object position and a Euclidean distance less than a maximum value, e.g., 120 pixels is used to establish a pre-track object sequence array. Properties such as the current frame Div-Discriminant feature value, current frame index (Tx), current pixel divergence, DivSum, object sequence point count, pixel indices, and average excursion range for axes are assigned to the current object element index (tmpPoints−1).

The COVD processing portion is illustrated in detail in FIGS. 2C(1) and 2C(2) while FIG. 2 illustrates the COVD portion within the overall FKCA method.

The Object Motion Features Rendering (OMFR) component renders space object motion features values for subsequent association to observed kinematic and orbital patterns. The OMFR process begins with synchronization of the current track index array with the associated object sequence index. Operations in this subprocess include traversing object sequence values (Trkcnt) and assigning (TrackIndex [Ndex]) as the current iteration interval while incrementing the hypothesis track (Ndex) which is the number of frame intervals assumed for the associated object pixel. The highest (Ndex) observed is recorded and updated for the current interval (Max Vtracks). The frame index (Fdex) is initialized relative to the latest frame count (FinDex) offset by the window size (SlideW). Using nested loops, track associated motion features are rendered. Interim track associated motion calculations include the following values: ordinate, abscissa, cubit fit (X and Y image plane axes independently), hypothesis track sequence length, current hypothesis track index, least square fit coefficients, maximum quadratic factors, and zeroth polynomial coefficient for valid tracks. Joint conditions for both X and Y zeroth polynomial coefficients must be met for valid tracks. For valid tracks, Fast Kinematic Constructs (FKC) are initialized and further tested via the following processing:

```
Track construction Initialization
    Fdex = 0
    Initialize ObjectID[Ndex] if new
    If (ObjectID[Ndex] = 0)
        Assign New ID
        Synthesize object ID using sequence and random time
```

-continued

```
        tmpMin = DateTime.Now.Day * 24 + DateTime.Now.Hour|
            + Ndex * 1000 + tmpTime.Millisecond
        ObjectID[Ndex] = tmpMin;
            Assign X and Y points before regression
            PrevEuclidSpeed = 0
Track construction frame [index traversal
While (Fdex <= FindDex)
Assign regression X/Y point values
Xpoint[Fdex] = TrackXCoef[Ndex, 0] + TrackXCoef[Ndex, 1] *
Fdex + TrackXCoef[Ndex, 2] * Fdex² + TrackXCoeff[Ndex, 3] *
Fdex³
Ypoint[Fdex] = TrackYCoef[Ndex, 0] + TrackYCoef[Ndex, 1] *
    Fdex + TrackYCoef[Ndex, 2] * Fdex² +
TrackYCoef[Ndex, 3] * Fdex3
Qualify for near border exclusion
if (Xpoint|Fdex] < dFPAwidth*0.05 | | Ypoint[Fdex] <
0.05*dFPAheight | | Ypoint[Fdex] >
dFPAheight * 1.05 | | Xpoint[Fdex] > dFPAwidth * 1.05 )
    NegFlag[Ndex] = true
Test for more than one track sequence length compute previous point
If (Fdex > 0)
    PrevXpoint = Xpoint(Fdex − 1];
    PrevYpoint = Ypoint[Fdex − 1];
Compute Incremental track speed components and Euclidean speed
XTrackspeed[Ndex] = (Xpoint[Fdex] − PrevXpoint) / FrameTime
YTrackspeed[Ndex] = (Ypoint[Fdex] − PrevYpoint) / FrameTime
PrevEuclidSpeed = EuclidSpeed
EuclidSpeed = Sqrt(XTrackspeed[Ndex]2 + YTrackspeed[Ndex]2
Test for more than two track sequence length and compute
acceleration
if (Fdex > 2)
    AccelDif = Abs(EuclidSpeed − PrevEuclidSpeed)
Compute composite object size
CompositeSize = Sqrt(TrackObjectSizeX[Ndex]² +
TrackObjectSizeY[Ndex]²)
Compute Track Angle
if (XTrackspeed[Ndex] != 0)
    TrackAngle[Ndex, Fdex] = Atan2(YTrackspeed[Ndex],
    XTrackspeed[Ndex])
        Determine angle change and scale DeltaAngleBin
DeltaAngBin = (100 * Math.Abs(TrackAngle[Ndex, Fdex] −
TrackAngle[Ndex, Fdex − 1]));
Qualify DeltaAngleBin range
if (DeltaAngBin > 2 && DeltaAngBin < 100)
```

Processing for emerging FKCs that satisfy the requisite tests advance.

Figure 2D:
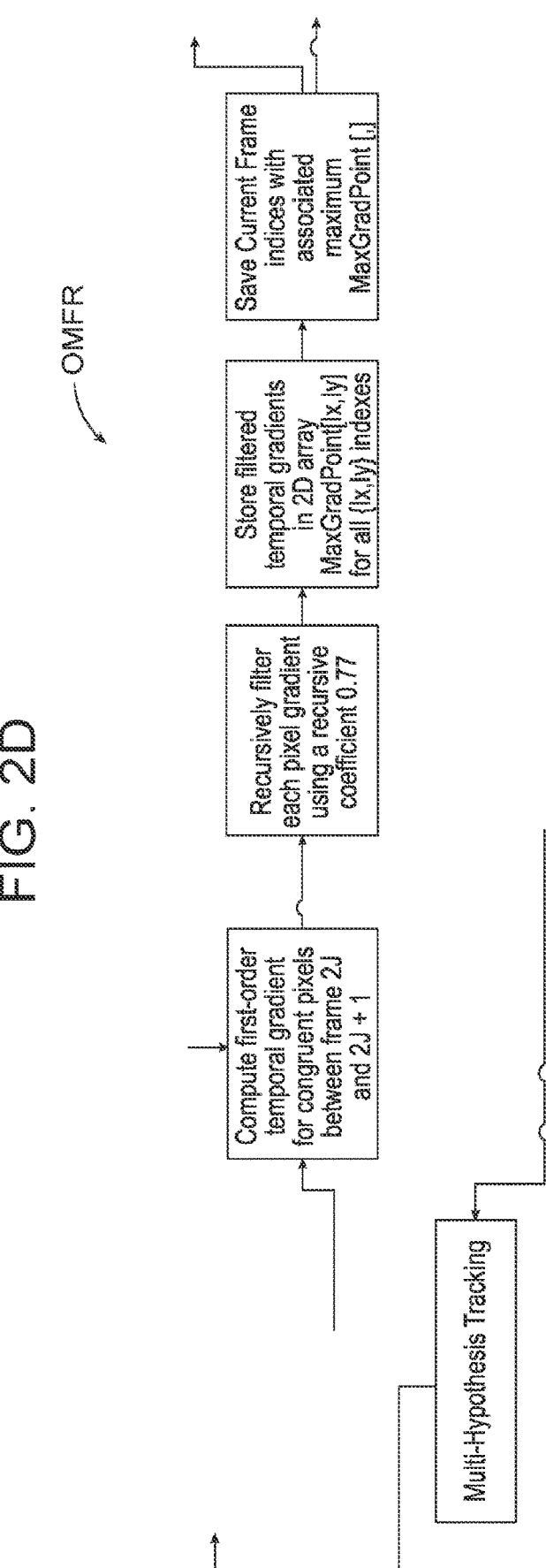
Figure 4A:
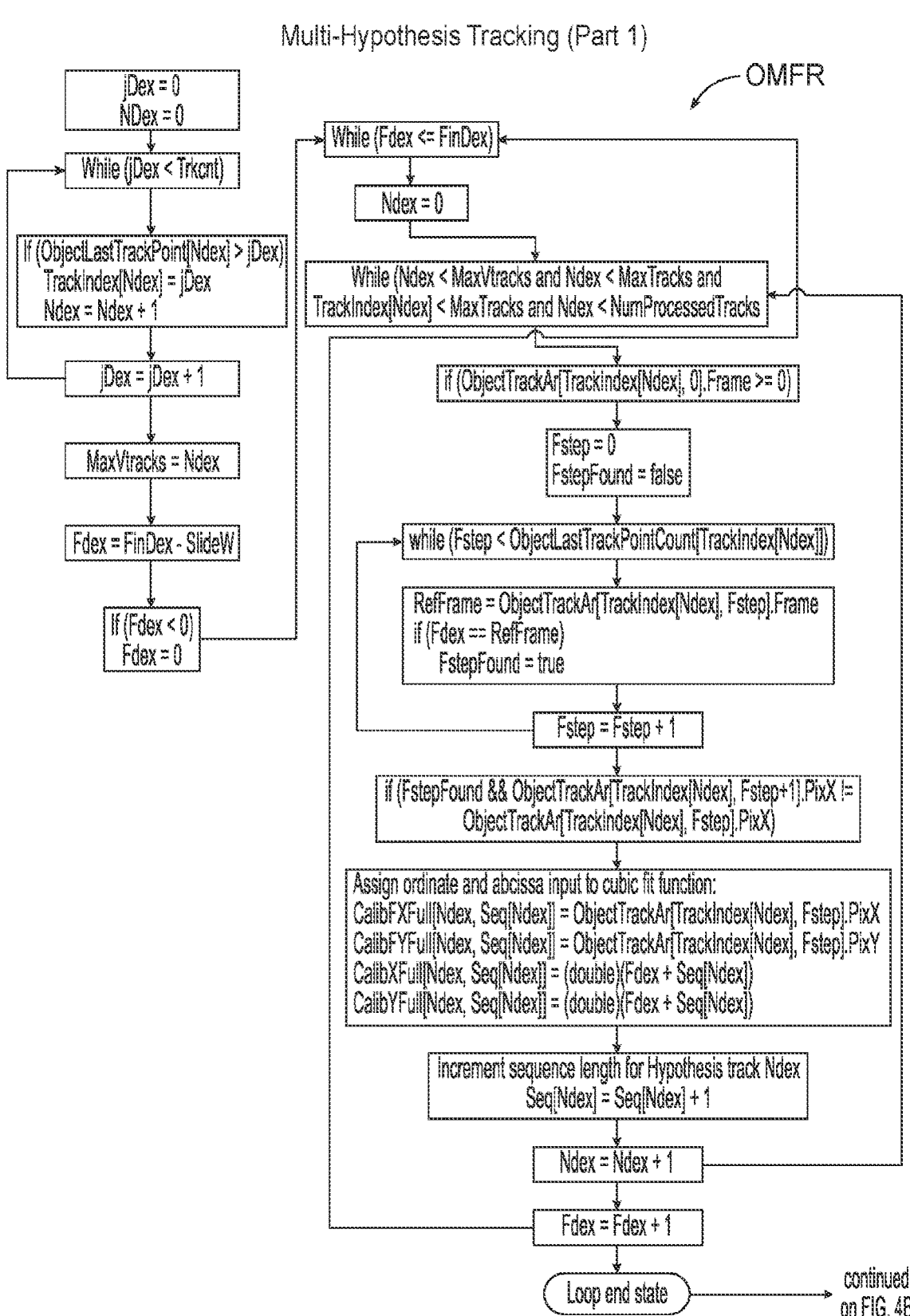
FIGS. 4A-4C illustrate Part 1 of the multi-hypothesis tracking aspect of the OMFR and OTVD components.
Figure 4B:
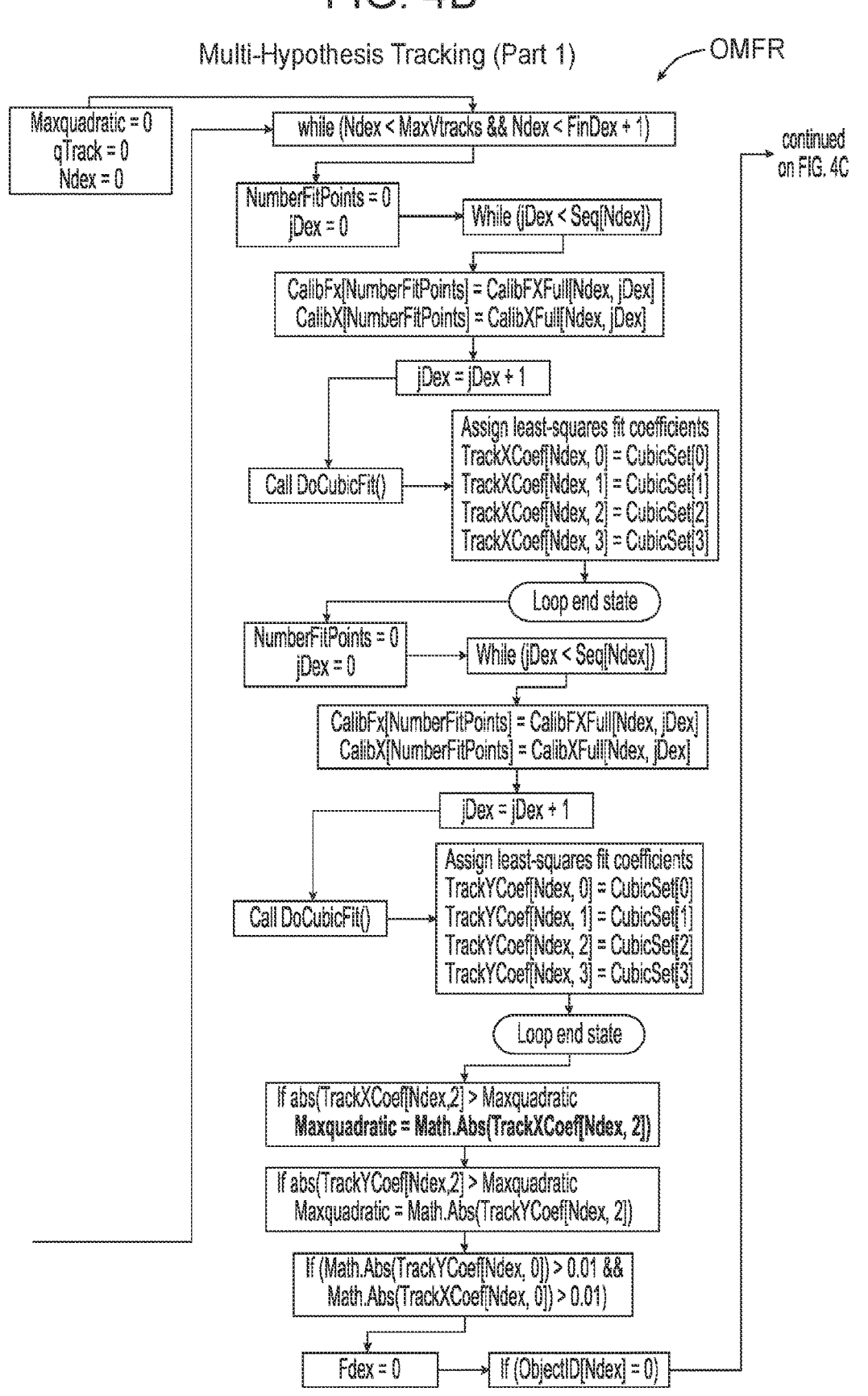
Figure 4C:
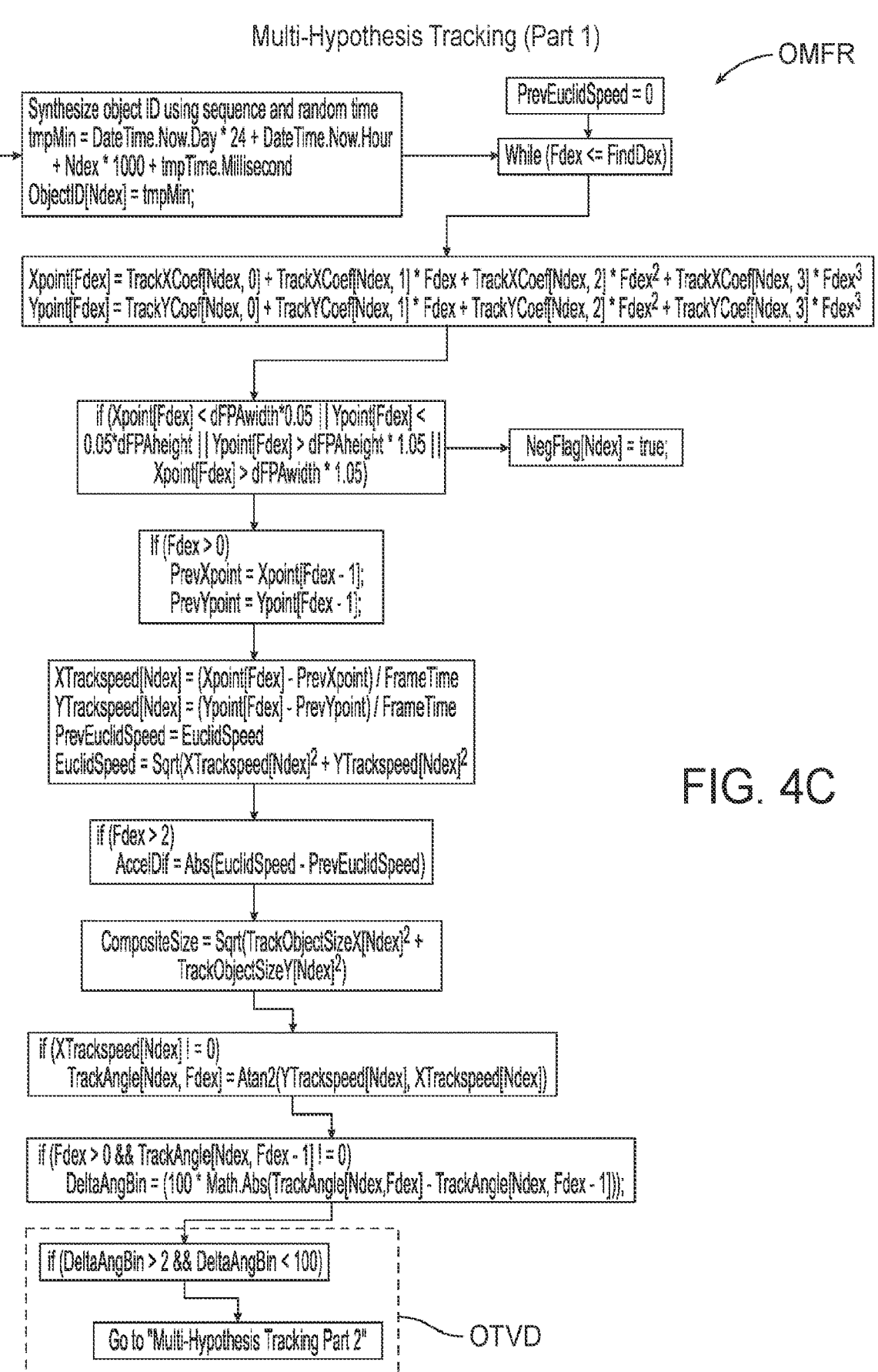

FIG. 2D illustrates in detail the OMFR processing while FIG. 2 illustrates the OMFR processing portion within the overall FKCA method. FIGS. 4A-4C are detailed illustrations of Part 1 of the Multi-Hypothesis Tracking shown in FIGS. 2 and 2D and FIGS. 5A-5B are detailed illustrations of Part 2 of the Multi-Hypothesis Tracking shown in FIG. 4C.

When the delta angle index for the track hypothesis is within a normal range, quantitative metrics are solidified in the final hypothesis tracking component—Object Track classification and key kinematic feature Values Determination (OTVD). OTVD stages are:

1. Histogram integration of differential track angle index.
2. Determine the filtered composite speed along the track.
3. Determine hybrid kinetic parameters derived from composite speed.
4. Estimate the object aspect ratio and zero-crossing counts during track.
5. Establish scale factors based on frame rate and orbital radii.
6. Qualify track by sufficient filtered composite speed and minimum frame count.
7. Set epoch time of frame interval and reset object type and pattern of life.
8. Perform object classification through Boolean arbitration of static and dynamic features.

9. Conclude pattern of life based on object type and divergence spread.

10. Convert object, presumed mass, and motion parameters to physics parameters in MKS units.

Histogram Integration of Differential Track Angle Index

Histogram counts of indexed track intervals, DeltaAngleBin, are incremented uniquely for the specific track index, Ndex:

$$HistDeltaAngle[Ndex, DeltaAngBin] += 1$$

Determine the Filtered Composite Speed Along the Track

Compute average X and Y component speed when cumulative angle displacement during track intervals that are less than PI/4:

```
while (angleDex > 2 && angleDisplacement < PI / 4)
    angleDisplacement += TrackAngle[Ndex, Fdex] − TrackAngle[Ndex,
    Fdex − angleDex]
    AvgSpeedX += XTrackspeed[angleDex + 1]
    AvgSpeedY += YTrackspeed[angleDex] + 1]
    IntervalCount = IntervalCount + 1
    angleDex = angleDex + 1
Normalize the average speed components:
AvgSpeedX /= (Fdex − angleDex)
AvgSpeedY /= (Fdex − angleDex)
Perform Euclidean conversion:
AvgCompositeSpeed = Sqrt(AvgSpeedX² + AvgSpeedY²)
Perform IIR filtering with RC = 0.95
if (FiltCompositeSpeed[Ndex] == 0)
    FiltCompositeSpeed[Ndex] = AvgCompositeSpeed
Else
    FiltCompositeSpeed[Ndex] = 0.95 * FiltCompositeSpeed[Ndex] +
0.05 * AvgCompositeSpeed
```

Determine Hybrid Kinetic Parameters Derived from Composite Speed

Enumerate calculations for effective radius during trajectory, linear momentum, angular momentum, and kinetic energy $$EffectiveRadius = (AvgCompositeSpeed * IntervalCount)$$

$$LinearMomentum = AvgCompositeSpeed * NomMass * DistConvertFactor$$

$$AngularMomentum = Abs(Sin(angleDisplacement)) * EffectiveRadius *$$

$$DisConvertFactor *$$

$$LinearMomentum$$

$$KineticEnergy = 0.5 * NomMass * AvgCompositeSpeed^2$$

$$AspectRatio = 0$$

Estimate the Object Aspect Ratio and Zero-Crossing Counts During Track

Qualify Non-zero X and Y component object size and perform ratio of larger over smaller size

```
if (TrackObjectSizeX[Ndex] > 0 && TrackObjectSizeY[Ndex] > 0)
    if (TrackObjectSizeY[Ndex] > TrackObjectSizeX[Ndex])
        AspectRatio = TrackObjectSizeY[Ndex] / TrackObjectSizeX[Ndex]
    else
        AspectRatio = TrackObjectSizeX[Ndex] / TrackObjectSizeY[Ndex]
End if
```

Establish Scale Factors Based on Frame Rate and Orbital Radii

Object Type Frame Rates and Distance Conversion

```
DistConvertFactor = 2.2
GEOframeRate = 1/7.43
LEOframeRate = 1 / 4.25
DistConvertGEO = 0.5089 / GEOframeRate
DistConvertLEO = 4.981 / LEOframeRate
```

Qualify Track by Sufficient Filtered Composite Speed and Minimum Frame Count

Frame interval selection of hypothesis track:

if(Fdex == $FinDex - 3$ and $Fdex > 3$ &&

$$FiltCompositeSpeed[Ndex] > 0.005)$$

Set Epoch Time of Frame Interval and Reset Object Type and Pattern of Life

Assign object hypothesis Ndex and epoch time

```
EpochTS = Now
tmpTrack.ObjectID = ObjectID[Ndex]
tmpTrack.EpochTime = EpochTS
Initialize Object Type and Pattern of Life:
tmpTrack.ObjectType = ""
tmpTrack.PatternOfLife = "Pending"
```

Perform Object Classification Through Boolean Arbitration of Static and Dynamic Features Object Classification

```
if (FiltCentroid < 3.9 && FiltCompositeSpeed[Ndex] < 1 )
    tmpTrack.ObjectType = "LEO_Obj"
else
    if (DivDiscriminant > 60 || (CompositeSize*AspectRatio > 120) ||
        (FiltCentroid > 4.5 && CompositeSize*AspectRatio > 105))
        tmpTrack.ObjectType = "MEO_Obj"
        DistConvertFactor *= 2.77;
    else
        tmpTrack.ObjectType = "GEO_Obj";
```

Conclude Pattern of Life Based on Object Type and Divergence Spread

Pattern of Life:

```
if (tmpTrack. ObjectType == "LEO")
    if (DivSpread > Min_LEO_Divspread)
        tmpTrack.PatternOfLife = "Orbital_Change"
    else
        tmpTrack.PatternOfLife = "Steady_State"
    if (tmpTrack.ObjectType == "GEO")
        if (DivSpread > Min_GEO_Divspread)
            tmpTrack.PatternOfLife = "Active_Control"
        else
            tmpTrack.PatternOfLife = "Defunct_Inactive"
    if (tmpTrack. ObjectType == "MEO")
        if (DivSpread > Min_MEO_Divspread)
            tmpTrack.PatternOfLife = "Active_Control"
        else
            tmpTrack.PatternOfLife = "Defunct_Inactive"
```

Convert object, presumed mass, and motion parameters to physics parameters in MKS units (e.g. measuring lengths in meters, mass in kilograms and time in seconds).

Conversion to MKS Units

```
AvgCompositeSpeed *= DistConvertFactor
EffectiveRadius = (AvgCompositeSpeed * IntervalCount)
LinearMomentum = AvgCompositeSpeed * NomMass *
    DistConvertFactor
AngularMomentum = Abs(Sin(angleDisplacement)) * EffectiveRadius
    * DistConvertFactor * LinearMomentum
KineticEnergy = 0.5 * NomMass * Math.Pow(AvgCompositeSpeed, 2)
tmpTrack.X = Xpoint[Fdex] * DistConvertFactor
tmpTrack.Y = Ypoint[Fdex] * DistConvertFactor
tmpTrack.VX = XTrackspeed[Ndex] * DistConvertFactor
tmpTrack.VY = YTrackspeed[Ndex] * DistConvertFactor
tmpTrack.Accel = AccelDiff * DistConvertFactor
tmpTrack.Angle = TrackAngle[Ndex, Fdex]
tmpTrack.ObjectSize = CompositeSize
tmpTrack.ObjAspectRatio = AspectRatio
tmpTrack.ObjDivergence = ObjectDiv[Ndex]
tmpTrack.AngMomentum = AngularMomentum
tmpTrack.LinearMomentum = LinearMomentum
tmpTrack.KineticEnergy = KineticEnergy
```

Figure 2E:
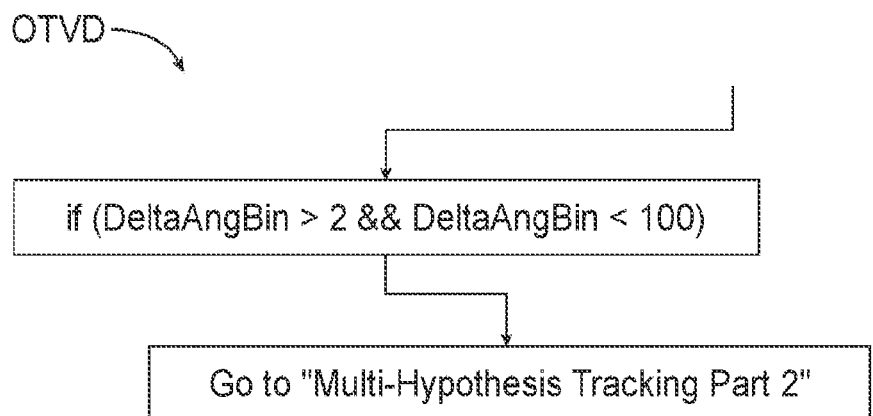
Figure 5A:
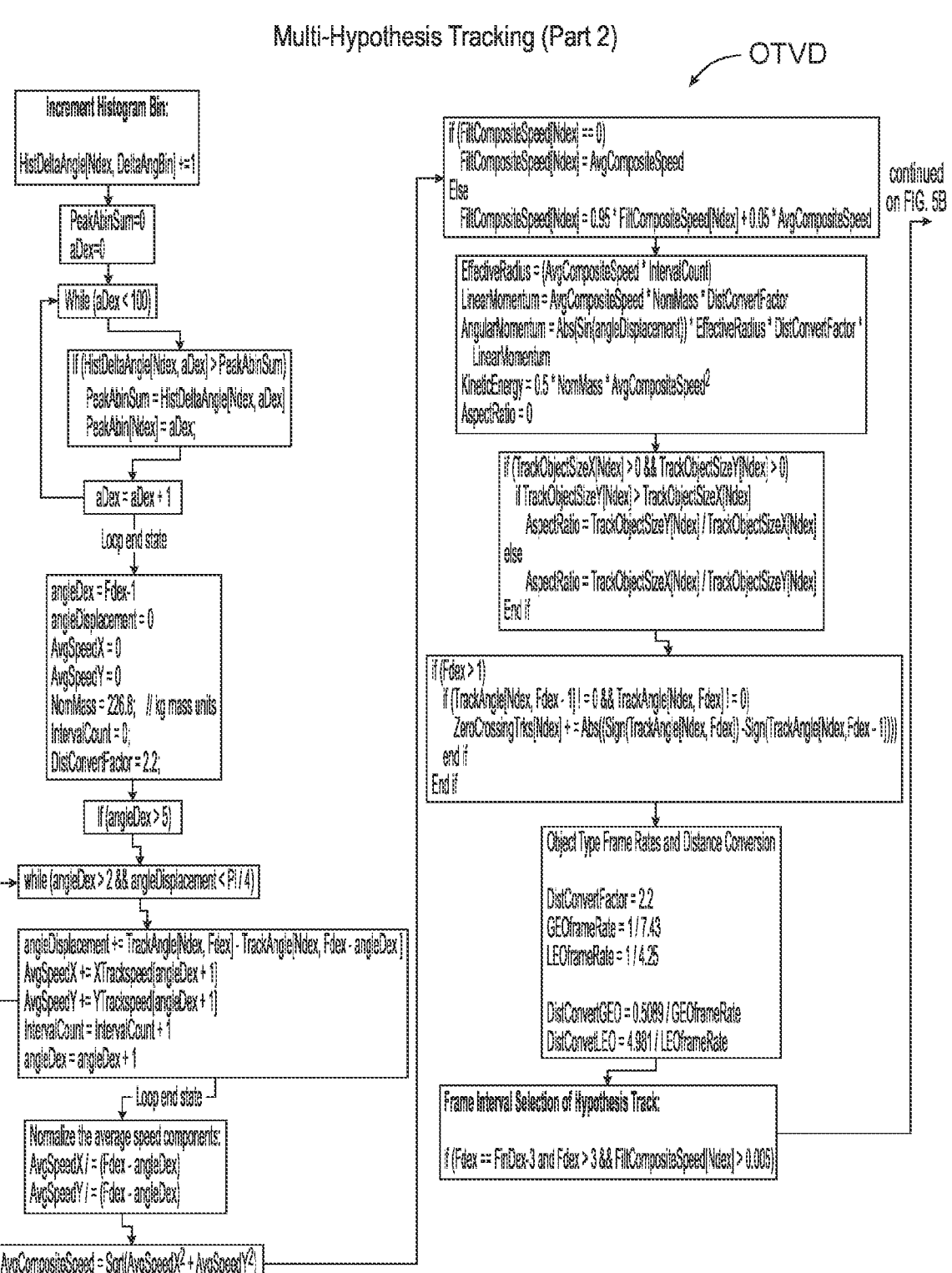

FIG. 2E illustrates in detail the OTVD processing while FIG. 4C illustrates the OTVD processing portion within Part 1 of the Multi-Hypothesis Tracking. FIGS. 5A and 5B illustrate the OTVD processing of Part 2 of the Multi-Hypothesis Tracking.

Parameter significance with respect to object types and relevant patterns of life (POL) are sensor and observed POL dependent. Parameter significance for FKCA operating environment and test conditions are as follows:

A general moving object presumption is reinforced by consistent monotonic or inverse-monotonic changes in Euclidean pixel position as a function of time.

Median first-order differences of pixel standard deviations are systematically smaller for LEOs versus MEOS and GEOS.

GEO satellites have slightly smaller median first-order standard deviations than do MEOs due to higher elevations or greater distance from the telescope.

GEOS have slightly higher aspect ratios from the Air Diffraction pattern than do LEOS due to their specific geometries.

The composite speed of LEOs have quasi-stationary levels when not performing orbital changes. Quasi-stationary composite speeds are associated with five possible orbital shells.

During orbital maneuvers, LEOs have a high normalized variance in composite speed.

The filtered standard deviation of the pixel divergence centroid has a lower mean value for LEO with generally higher values for MEOs than GEOs due to its closer range.

Active control modes of GEO are associated with a divergence standard deviation that exceeds 50% of the mean.

Combinatorial use of the divergence discriminant, composite size, aspect ratio, and filtered centroid are used for distinguishing MEOs from GEOs.

Some features of the disclosed innovation can be characterized as:

A Fast Kinematic Construct Approach (FKCA) method, comprising the steps of: (1) Frame/Image Management (FIM), (2) Autonomous Ambient Level Correction (AALC), (3) Candidate Object divergence, size and pixel indices Values Derivation (COVD), (4) Object Motion Features Rendering (OMFR) and (5) Object Track Classification and Key Kinematic Feature Values Determination (OTVD).

The above method further comprising the four step(s) of AALC:

measuring the spatial gradient on both X and Y axes for each pixel in the current frame and the smooth filtered mean divergence sum.

updating during current frame processing weighted products and index weight sums.

computing current frame weighted centroid and updated filtered centroid, and computing the adaptive threshold to partially qualify pixels for hypothesis track coordinates in addition to a Gaussian divergence discriminant determined from the filtered mean plus two standard deviations.

This disclosure may be said to relate to an improved computing device and method having association with the following items:

1. A method for characterizing anthropogenic space objects, comprising:

receiving, by computing device, sensing and imaging electro-optical pixel data respecting the anthropogenic space objects;

performing, by the computing device, ambient level correction of the electro-optical pixel data by subtracting background noise attributed to wide field luminescence due to stars and cosmic radiation; and creating, by the computing device, fast kinematic constructs for the anthropogenic space objects whereby the anthropogenic space objects are detected, discriminated and characterized.

2. The method of item 1, including implementing, by the computing device, embedded convolution to characterize localized motion of the anthropogenic space objects.

3. The method of item 2, including completing, by the computing device, the implementing via functionalized components that execute by frame, using multi-frames, traverse at the pixel level, involve multi-pixel windows or involve other iterative processing as indicated for that component.

4. The method of item 2, including completing, by the computing device, the implementing via at least one functionalized component selected from a group consisting of Frame/Image Management (FIM), Autonomous Ambient Level Correction (AALC), Candidate Object divergence, size and pixel indices Values Derivation (COVD), Object Motion Features Rendering (OMFR) and Object Track classification and key kinematic feature Values Determination (OTVD).

5. The method of item 2, including completing, by the computing device, the implementing via five functionalized components including Frame/Image Management (FIM), Autonomous Ambient Level Correction (AALC), Candidate Object divergence, size and pixel indices Values Derivation (COVD), Object Motion Features Rendering (OMFR) and Object Track classification and key kinematic feature Values Determination (OTVD).

6. The method of any of items 1-5, including performing, by the computing device, You Only Process Once (YOPO) algorithmic processing whereby each frame of digital imagery is fully processed only once to provide more efficient Space Domain Awareness (SDA).

7. The method of item 6, including receiving, in a buffer of the computing device, a Flexible Image Transport System (FITS) formatted image file and using, by the computing device, a customizable timer control loop so as to allow for differential pixel array loading and awaiting, by the computing device, a flagged response to initiate a request for subsequent frame processing.

8. The method of item 7, including time stamping, by the computing device, image arrival rather than relying upon sequential identification.

9. The method of item 1, including performing, by the computing device, Autonomous Ambient Level Correction (AALC) to provide deterministic processing within a limited interval and with reduced bandwidth required for results data transfer.

10. The method of item 9, including completing, by the computing device, the AALC by (a) measuring the spatial gradient on both X and Y axes for each pixel in a current frame and a smooth filtered mean divergence sum, (b) updating during current frame processing weighted products and index weight sums, (c) computing current frame weighted centroid and updated filtered centroid and (d) computing an adaptive threshold to partially qualify pixels for hypothesis track coordinates in addition to a Gaussian divergence discriminant determined from the filtered mean plus two standard deviations.

11. The method of item 10, including, performing, by the computing device, Candidate Object divergence, size and pixel indices Values Derivation (COVD) when pixel divergence exceeds a product of the factored smooth mean divergence value and an adaptive threshold.

12. The method of item 11, including deriving, by the computing device, both vertical and horizontal divergence excursion ranges for determination of an inferred relative object size and aspect ratio with respect to each pixel in an array.

13. The method of item 12, including (a) recursively filtering, by the computing device, size components and (b) assigning, by the computing device, a local divergence for each pixel to an object instance used for qualified hypothesis tracks.

14. The method of item 13, including (a) performing, by the computing device, a center pixel translation through calculation of DeltaCenterX and DeltaCenterY variables and (b) establishing, by the computing device, a pre-track object sequence array for any pixel that has a sufficient Euclidean distance with respect to a prior indexed object position and a Euclidean distance less than a maximum predetermined value.

15. The method of item 14, including assigning to a current object element index, by the computing device, a current frame DivDiscriminant feature value, a current frame index (Tx), a current pixel divergence, a DivSum, an object sequence point count, pixel indices, and average excursion range for axes.

16. The method of item 11, including, performing, by the computing device, an Object Motion Features Rendering (OMFR) component to render space object motion feature values for subsequent association to observed kinematic and orbital patterns.

17. The method of item 16, including synchronizing, by the computing device, a current track index array with an associated object sequence index for the anthropogenic space object by traversing object sequence values and assigning (TrackIndex [Ndex]) as a current iteration interval while incrementing a hypothesis track (Ndex) which is the number of frame intervals assumed for the associated object pixel.

18. The method of item 17, including rendering, by the computing device, track associated motion features using nested loops wherein track associated motion calculations include ordinate, abscissa, cubit fit (X and Y image plane axes independently), hypothesis track sequence length, current hypothesis track index, least square fit coefficients, maximum quadratic factors, and zeroth polynomial coefficient for valid tracks.

19. The method of item 16, including performing, by the computing device, Object Track classification and key kinematic feature Values Determination (OTVD).

20. The method of item 19, wherein the OTVD includes, performing, by the computing device: (a) histogram integrating of a differential track angle index, (b) determining a filtered composite speed along the track, (c) determining hybrid kinetic parameters derived from the filtered composite speed, (d) estimating an object aspect ratio and zero-crossing counts during track, (e) establishing scale factors based on frame rate and orbital radii, (f) qualifying the track by sufficient filtered composite speed and minimum frame count, (g) setting epoch time of frame interval and resetting object type and pattern of life, (h) classifying objects through Boolean arbitration of static and dynamic features, (i) concluding the pattern of life based on object type and divergence spread, (j) converting object, presumed mass, and motion parameters to physics parameters and (k) determining parameter significance when corroborated with 3D centered coordinate data.

Each of the following terms written in singular grammatical form: "a", "an", and "the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrase: "an anthropogenic object", as used herein, may also refer to, and encompass, a plurality of anthropogenic objects.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

The phrase "consisting of", as used herein, is closed-ended and excludes any element, step, or ingredient not specifically mentioned. The phrase "consisting essentially of", as used herein, is a semi-closed term indicating that an item is limited to the components specified and those that do not materially affect the basic and novel characteristic(s) of what is specified.

Terms of approximation, such as the terms about, substantially, approximately, etc., as used herein, refers to +10% of the stated numerical value.

Although the method of this disclosure has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

What is claimed:

1. A method for characterizing anthropogenic space objects, comprising:

receiving, by computing device, sensing and imaging electro-optical pixel data respecting the anthropogenic space objects;

performing, by the computing device, ambient level correction of the electro-optical pixel data by subtracting background noise attributed to wide field luminescence due to stars and cosmic radiation;

performing, by the computing device, Autonomous Ambient Level Correction (AALC) to provide deterministic processing within a limited interval and with reduced bandwidth required for results data transfer;

completing, by the computing device, the AALC by (a) measuring a spatial gradient on both X and Y axes for each pixel in a current frame and a smooth filtered mean divergence sum, (b) updating during current frame processing weighted products and index weight sums, (c) computing current frame weighted centroid and updated filtered centroid and (d) computing an adaptive threshold to partially qualify pixels for hypothesis track coordinates in addition to a Gaussian divergence discriminant determined from the smooth filtered mean divergence sum plus two standard deviations; and creating, by the computing device, fast kinematic constructs for the anthropogenic space objects whereby the anthropogenic space objects are detected, discriminated and characterized.

2. The method of claim 1, including implementing, by the computing device, embedded convolution to characterize localized motion of the anthropogenic space objects.

3. The method of claim 2, including completing, by the computing device, the implementing via functionalized components that execute by frame, using multi-frames, traverse at the pixel level, involve multi-pixel windows or involve other iterative processing as indicated for that component.

4. The method of claim 2, including completing, by the computing device, the implementing via at least one functionalized component selected from a group consisting of Frame/Image Management (FIM), Autonomous Ambient Level Correction (AALC), Candidate Object divergence, size and pixel indices Values Derivation (COVD), Object Motion Features Rendering (OMFR) and Object Track classification and key kinematic feature Values Determination (OTVD).

5. The method of claim 2, including completing, by the computing device, the implementing via five functionalized components including Frame/Image Management (FIM), Autonomous Ambient Level Correction (AALC), Candidate Object divergence, size and pixel indices Values Derivation (COVD), Object Motion Features Rendering (OMFR) and Object Track classification and key kinematic feature Values Determination (OTVD).

6. The method of any of claims 1-5, including performing, by the computing device, You Only Process Once (YOPO) algorithmic processing whereby each frame of digital imagery is fully processed only once to provide more efficient Space Domain Awareness (SDA).

7. The method of claim 6, including receiving, in a buffer of the computing device, a Flexible Image Transport System (FITS) formatted image file and using, by the computing device, a customizable timer control loop so as to allow for differential pixel array loading and awaiting, by the computing device, a flagged response to initiate a request for subsequent frame processing.

8. The method of claim 7, including time stamping, by the computing device, image arrival rather than relying upon sequential identification.

9. The method of claim 1, including, performing, by the computing device, Candidate Object divergence, size and pixel indices Values Derivation (COVD) when pixel divergence exceeds a product of the smooth filtered mean divergence sum and an adaptive threshold.

10. The method of claim 9, including deriving, by the computing device, both vertical and horizontal divergence excursion ranges for determination of an inferred relative object size and aspect ratio with respect to each pixel in an array.

11. The method of claim 10, including (a) recursively filtering, by the computing device, size components and (b) assigning, by the computing device, a local divergence for each pixel to an object instance used for qualified hypothesis tracks.

12. The method of claim 11, including (a) performing, by the computing device, a center pixel translation through calculation of DeltaCenterX and DeltaCenterY variables and (b) establishing, by the computing device, a pre-track object sequence array for any pixel that has a sufficient Euclidean distance with respect to a prior indexed object position and a Euclidean distance less than a maximum predetermined value.

13. The method of claim 12, including assigning to a current object element index, by the computing device, a current frame DivDiscriminant feature value, a current frame index (Tx), a current pixel divergence, a DivSum, an object sequence point count, pixel indices, and average excursion range for axes.

14. The method of claim 9, including, performing, by the computing device, an Object Motion Features Rendering (OMFR) component to render space object motion feature values for subsequent association to observed kinematic and orbital patterns.

15. The method of claim 14, including synchronizing, by the computing device, a current track index array with an associated object sequence index for the anthropogenic space object by traversing object sequence values and assigning (TrackIndex[Ndex]) as a current iteration interval while incrementing a hypothesis track (Ndex) which is the number of frame intervals assumed for the associated object pixel.

16. The method of claim 15, including rendering, by the computing device, track associated motion features using nested loops wherein track associated motion calculations include ordinate, abscissa, cubit fit (X and Y image plane axes independently), hypothesis track sequence length, current hypothesis track index, least square fit coefficients, maximum quadratic factors, and zeroth polynomial coefficient for valid tracks.

17. The method of claim 14, including performing, by the computing device, Object Track classification and key kinematic feature Values Determination (OTVD).

18. The method of claim 17, wherein the OTVD includes, performing, by the computing device: (a) histogram integrating of a differential track angle index, (b) determining a filtered composite speed along the track, (c) determining hybrid kinetic parameters derived from the filtered composite speed, (d) estimating an object aspect ratio and zero-crossing counts during track, (e) establishing scale factors based on frame rate and orbital radii, (f) qualifying the track by sufficient filtered composite speed and minimum frame count, (g) setting epoch time of frame interval and resetting object type and pattern of life, (h) classifying the anthropogenic space objects through Boolean arbitration of static and dynamic features, (i) concluding the pattern of life based on object type and divergence spread, (j) converting object, presumed mass, and motion parameters to physics parameters and (k) determining parameter significance when corroborated with 3D centered coordinate data.

* * * * *